(12) United States Patent
Maestle et al.

(10) Patent No.: US 12,535,411 B2
(45) Date of Patent: Jan. 27, 2026

(54) METHOD AND DEVICE FOR DETERMINING AT LEAST ONE PROPERTY OF AT LEAST ONE LAYER USING TERAHERTZ RADIATION

(71) Applicant: Helmut Fischer GmbH Institut fuer Elektronik und Messtechnik, Sindelfingen (DE)

(72) Inventors: Ruediger Maestle, Boeblingen (DE); Lars-Christian Anklamm, Berlin (DE); Jens Maisenbacher, Magstadt (DE); Helge Ketelsen, Stuttgart (DE)

(73) Assignee: Helmut Fischer GmbH Institut fuer Elektronik und Messtechnik, Sindelfingen (DE)

( * ) Notice: Subject to any disclaimer, the term of this patent is extended or adjusted under 35 U.S.C. 154(b) by 175 days.

(21) Appl. No.: 18/268,902

(22) PCT Filed: Oct. 8, 2021

(86) PCT No.: PCT/EP2021/077958
§ 371 (c)(1),
(2) Date: Jun. 21, 2023

(87) PCT Pub. No.: WO2022/135763
PCT Pub. Date: Jun. 30, 2022

(65) Prior Publication Data
US 2024/0418640 A1    Dec. 19, 2024

(30) Foreign Application Priority Data
Dec. 21, 2020   (DE) .......................... 102020134498.8

(51) Int. Cl.
  *G01N 21/35*     (2014.01)
  *G01N 21/3563*   (2014.01)
  *G01N 21/3581*   (2014.01)

(52) U.S. Cl.
  CPC ..... *G01N 21/3563* (2013.01); *G01N 21/3581* (2013.01)

(58) Field of Classification Search
  CPC ........................ G01N 21/3563; G01N 21/3581
  See application file for complete search history.

(56) References Cited

U.S. PATENT DOCUMENTS

| | | | |
|---|---|---|---|
| 2015/0211934 A1* | 7/2015 | Van Mechelen | G01N 21/3563 250/341.1 |
| 2015/0212060 A1 | 7/2015 | Van Mechelen et al. | |

(Continued)

FOREIGN PATENT DOCUMENTS

| | | |
|---|---|---|
| CN | 111751314 A | 10/2020 |
| DE | 102011104708 A1 | 12/2012 |

(Continued)

OTHER PUBLICATIONS

International Preliminary Report on Patentability mailed Jun. 13, 2023, in PCT Application No. PCT/EP2021/077958.

(Continued)

*Primary Examiner* — Hugh Maupin
(74) *Attorney, Agent, or Firm* — KRIEGSMAN & KRIEGSMAN

(57) ABSTRACT

Method for determining at least one property of at least one first layer than can be applied to a substrate using terahertz, THz, radiation, comprising: determining at least one property of the substrate, applying the first layer to the substrate, determining the at least one property of the first layer.

23 Claims, 12 Drawing Sheets

(56) References Cited

U.S. PATENT DOCUMENTS

| | | | |
|---|---|---|---|
| 2016/0041089 A1* | 2/2016 | Hovinen | G01N 21/211 |
| | | | 250/341.8 |
| 2018/0164354 A1 | 6/2018 | Azanza Ladrón et al. | |
| 2020/0240909 A1 | 7/2020 | Maas et al. | |
| 2020/0306780 A1* | 10/2020 | Maas | B05B 16/20 |

FOREIGN PATENT DOCUMENTS

| | | | |
|---|---|---|---|
| WO | 2010098740 A1 | 9/2010 | |
| WO | 2020038573 A1 | 2/2020 | |

OTHER PUBLICATIONS

Rahman et al., "Terahertz reflection interferometry for automobile paint layer thickness measurement," Proceedings of SPIE, IEEE, 9489:94890H1-94890H6 (2015).
Su et al., "Terahertz Sensor for Non-Contact Thickness and Quality Measurement of Automobile Paints of Varying Complexity," IEEE Transactions on Terahertz Science and Technology, 4(4):432-439 (2014).
International Search Report mailed Nov. 29, 2021, in PCT Application No. PCT/EP2021/077958 and English translation thereof.
Written Opinion mailed Nov. 29, 2021, in PCT Application No. PCT/EP2021/077958 and English translation thereof.

* cited by examiner

METHOD AND DEVICE FOR DETERMINING AT LEAST ONE PROPERTY OF AT LEAST ONE LAYER USING TERAHERTZ RADIATION

The disclosure relates to a method for determining at least one property of at least one layer using terahertz radiation.

The disclosure further relates to a device for determining at least one property of at least one layer using terahertz radiation.

Exemplary embodiments relate to a method for determining at least one property of at least one first layer that can be applied to a substrate using terahertz, THz, radiation, said method comprising: determining at least one property of the substrate, applying the first layer to the substrate, determining the at least one property of the first layer, and thus, for example, of the layer applied to the substrate.

In further exemplary embodiments, the substrate has a metallic base body or a non-metallic base body having a metallic (e.g., metallised) surface. In further exemplary embodiments, the substrate has a non-metallic base body, wherein the base body has a plastic material, for example.

In further exemplary embodiments, it is provided that the method further comprises: applying at least one further, for example nth, layer, for example to the first layer or to a layer previously applied to the substrate, wherein for example n is a positive integer greater than or equal to two and, optionally, determining at least one property of the at least one further layer.

In further exemplary embodiments, applying the first and/or the at least one further layer can for example comprise applying a liquid and/or gaseous medium to at least one (e.g., uncoated or already coated) surface of the substrate, which forms the layer in question, for example, after the application.

In further exemplary embodiments, several layers can be applied to the substrate or on top of one another by means of the application, whereby for example a layer structure having the substrate and the several layers results.

In further exemplary embodiments, the application comprises coating the substrate with a paint.

In further exemplary embodiments, the method comprises: repeating a) the application of the at least one further layer, and optionally b) the determination of at least one property of the at least one further layer. In this way, one or several properties of a respective layer can successively be determined in an exemplary manner, wherein in further exemplary embodiments, interactions, for example, can also be accounted for in the region of border surfaces between layers bordering one another.

In further exemplary embodiments, the repetition of the application of the at least one further layer is carried out until, for example, a pre-determined termination condition is satisfied. For example, the presence of a number of layers that can be pre-determined on the substrate can characterise a termination condition.

In further exemplary embodiments, a number of layers equal to n can be applied, for example, and the at least one property of the layer in question is not determined for each of the number of layers equal to n, for example, but instead only for a number of layers equal to k<n, for example. In other words, in further exemplary embodiments, at least one or some layers can also be applied without the at least one property of the applied layer being determined after they are applied. For example, the at least one property of the at least one applied layer (or some layers) can be known a priori. For example, in further exemplary embodiments, it can be provided that an (i+1)th layer is applied after the ith layer, and at least one property e.g., of the two previously applied layers i and i+1 can then be determined, for example.

In further exemplary embodiments, the THz radiation has at least one spectral component in the range between 0.1 THz and 30 THz, for example between 0.3 THz and 10 THz.

In further exemplary embodiments, the at least one property of the substrate and/or the first layer and/or the at least one further layer has at least one of the following elements: a) optical properties, b) thickness, c) magnetic permeability, d) electrical conductivity, e) roughness.

In further exemplary embodiments, the optical properties are a dispersion for the THz radiation, for example. In further exemplary embodiments, the dispersion can be characterised by a refractive index n and an extinction coefficient e. For example, in further exemplary embodiments, the refractive index n and/or the extinction coefficient e can be dependent on a frequency of the THz radiation, such that a dispersion can be characterised for example by a plurality of refractive index values or values for the extinction coefficients at different respective frequencies.

In further exemplary embodiments, the optical properties are for example gradients e.g., in the refractive index or the layer thickness and/or a porosity and/or transmission and/or reflection, e.g. in the case of particular frequencies, and/or around structures and/or particles in the layer or the substrate.

In further exemplary embodiments, determining properties of the substrate further comprises: determining at least one surface property of a surface of the substrate, wherein for example the at least one surface property has at least one of the following elements: a) roughness, b) shape, e.g., bend, c) spatial position (which can for example be characterised by a direction of a normal vector of the surface, for example in relation to an optical axis of a THz device providing the THz radiation), d) structures, e.g., an arrangement of foreign material in the substrate (e.g., metallic deposits in a plastic substrate) and/or a shaping of the surface, e.g., structuring or micro-structuring.

In further exemplary embodiments, the at least one surface property is determined for example by means of at least one of the following elements: a) confocal microscopy, b) interferometry, c) optical coherence tomography, d) three-dimensional imaging.

In further exemplary embodiments, the method further comprises: using at least one measurement method based on reflection of the THz radiation and/or at least one measurement method based on transmission of the THz radiation, e.g., THz spectroscopy and/or THz ellipsometry, and/or at least one further measurement method, e.g., not based on THz radiation, e.g., a tactile measurement method, for at least one of the following elements: a) determining the at least one property of the substrate, b) determining the at least one property of the first layer, c) determining the at least one property of the at least one further layer, d) determining the at least one surface property of a surface of the substrate.

In further exemplary embodiments, the method further comprises: varying an orientation of the substrate or of an object having the substrate. For example, in further exemplary embodiments, several THz-based and/or non-THz-based measurement methods can be used for several measurements of the object, wherein the several measurements differ e.g., in relation to an orientation of the object or substrate, for example relative to an optical axis of a or of the THz device. Information useful or that can be used for determining the at least one property can thus be determined for objects or substrates or layers having anisotropies.

In further exemplary embodiments, the method further comprises: varying an angle of incidence of the THz radiation, for example in relation to a normal vector of the surface of the substrate or a layer arranged thereon.

In further exemplary embodiments, the method further comprises at least one of the following elements: a) varying a polarisation of the THz radiation, b) varying a direction of passage of the THz radiation, c) at least periodically reflecting the THz radiation, for example by means of at least one mirror that can be introduced into a beam path of the THz radiation for at least some THz-based measurements.

In further exemplary embodiments, the method further comprises: carrying out at least one measurement method or the at least one measurement method for several measurement points, for example a number of measurement points equal to M, where M>1, wherein the several measurement points are for example assigned to different places on the surface of the substrate or to a corresponding layer.

In further exemplary embodiments, in which several measurement points are respectively used for the substrate ("substrate measurement") and at least one layer ("layer measurement") or for several layers, the same measurement points are preferably used in relation to the substrate and/or the respective layer(s), which can increase precision. In further exemplary embodiments, the same measurement points can respectively be used for all measurements, for example.

In further exemplary embodiments, the method further comprises: combining measurement results of several measurement points of a measurement method, for example the number of measurement points equal to M. In further exemplary embodiments, for example, the measurements results of several measurement points of at least one measurement method (e.g., for the substrate and/or at least one layer) can be used as input data for a model to determine the at least one property.

In further exemplary embodiments, the method further comprises: determining at least one reference layer thickness, for example a number of reference layer thicknesses equal to M, of the first layer, for example at a number of measurement points equal to M.

In further exemplary embodiments, the same or at least some of the same measurement points, for example, are used to determine the number of reference layer thicknesses equal to M of the first layer as are also used for the substrate measurement and/or the at least one layer measurement.

In further exemplary embodiments, the method further comprises: determining at least one reference layer thickness, for example a number of reference layer thicknesses equal to M, of the at least one further, e.g. nth layer, for example at a number of measurement points equal to M.

In further exemplary embodiments, the same or at least some of the same measurement points, for example, are used to determine the number of reference layer thicknesses equal to M of the at least one further layer as are also used for the substrate measurement and/or the at least one layer measurement.

In further exemplary embodiments, the determination of the at least one reference layer thickness of the first layer and/or of the at least one further layer is carried out on the basis of one or the one further measurement method, e.g., not based on THz radiation, e.g., tactile measurement method.

In further exemplary embodiments, the determination of the at least one reference layer thickness of the first layer is carried out after the application of the first layer. In further exemplary embodiments, the determination of the at least one reference layer thickness of the at least one further layer is carried out after the application of the at least one further layer, for example after all the layers provided have been applied.

In further exemplary embodiments, it is provided that a) the carrying out of the at least one measurement method for several measurement points, for example for a number of measurement points equal to M, where M>1, and/or b) the determination of the at least one reference layer thickness, for example of a number of reference layer thicknesses equal to M, of the first layer, for example at the number of measurement points equal to M, and/or c) the determination of the at least one reference layer thickness, for example of a number of reference layer thicknesses equal to M, of the at least one further layer is respectively carried out for the same number of measurement points, for example equal to M.

In further exemplary embodiments, the method further comprises: specifying and/or accounting for deviations for the at least one reference layer thickness. Possible deviations (e.g., due to a finite measurement precision of a measurement method used) of the at least one reference layer thickness from an actual layer thickness of the layer in question can thus be accounted for, e.g., to determine the at least one property of the first layer.

In further exemplary embodiments, specifying and/or accounting for deviations for the at least one reference layer thickness comprises providing a layer thickness region which can for example be characterised by two layer thickness values and can for example be selected such that the reference layer thickness, for example determined by measurement technology, lies in an interval that can be characterised by the layer thickness region.

In further exemplary embodiments, specifying and/or accounting for deviations for the at least one reference layer thickness can for example be respectively carried out for several measurement points.

If, for example, a value $RD1_1$ is obtained as a reference layer thickness for the first layer in a first measurement point, the layer thickness region previously described in an exemplary manner can for example be characterised by the two layer thickness values $RD1_1-\Delta RD1$, $RD1_1+\Delta RD1$, wherein the parameter $\Delta RD1$ can for example be selected on the basis e.g., of a known measurement precision in relation to the measurement of the reference layer thickness $RD1_1$. In further exemplary embodiments, the same procedure can be undertaken in a comparable manner for further measurement points and their respectively assigned reference layer thicknesses $RD1_2$, $RD1_3$, ... e.g., by specifying corresponding layer thickness regions $RD1_2 31 \Delta RD1$, $RD1_2+\Delta RD1$, $RD1_3-\Delta RD1$, $RD1_3+\Delta RD1$, ....

In further exemplary embodiments, the method further comprises: determining at least one optical property of the first layer on the basis of a) at least one measurement result of at least one measurement method based on THz radiation in relation to the first layer applied to the substrate and optionally on the basis of b) at least one or the at least one reference layer thickness. In further exemplary embodiments, both the at least one measurement result of the at least one measurement method based on terahertz radiation in relation to the first layer applied to the substrate and the at least one reference layer thickness are used to determine the at least one optical property of the first layer.

In further exemplary embodiments, the method further comprises: determining at least one optical property of the at least one further layer on the basis of a) at least one measurement result of at least one measurement method based on THz radiation in relation to the at least one further layer and, optionally, on the basis of b) at least one or the at least one reference layer thickness of the at least one further layer. In further exemplary embodiments, both the at least one measurement result of the at least one measurement method based on terahertz radiation and the at least one reference layer thickness of the at least one further layer are used to determine the at least one optical property of the at least one further layer.

In further exemplary embodiments, it is provided that the determining of the at least one optical property of the at least one further layer is additionally carried out on the basis of at least one reference layer thickness and/or at least one optical property of at least one layer applied to the substrate before the at least one further layer and/or on the basis of at least one property of the substrate. In this way, in further exemplary embodiments, information in relation to at least one layer presently applied to the substrate can advantageously also be used to determine the at least one optical property of the at least one further layer.

In further exemplary embodiments, it is provided that the method comprises: determining several variants of the at least one, e.g., optical property of the first layer and/or at least one further layer or the at least one further layer, and, optionally, determining a particular variant of the several variants, for example by means of a variation calculation.

In further exemplary embodiments, the several variants are determined or generated, for example, by using different values for the reference layer thickness(es), for example in the sense of the layer thickness regions $RD1_2-\Delta RD1$, $RD1_2+\Delta RD1$, $RD1_3-\Delta RD1$, $RD1_3+\Delta RD1$, . . . previously described in an exemplary manner.

In further exemplary embodiments, several variants of the properties, e.g., optical properties, e.g., dispersion can respectively be determined for one, several or all layers of an object. In further exemplary embodiments, a particular variant of the (e.g., optical) properties can respectively be determined or selected, e.g., for every layer on the basis of these variants, for example by means of a variation calculation. In further exemplary embodiments, the selection can for example be carried out according to at least one of the following criteria: accuracy (e.g., able to be characterised by agreement with measurement data of further/other measurement methods e.g. tactile reference measurements and/or micrographs or other THz-based methods), stability, fit (e.g., able to be characterised by agreement of values that can be modelled on the basis of the selected particular variant(s) with measurement values, which are for example determined by means of the THz-based measurement method(s)).

In further exemplary embodiments, it is provided that determining the at least one optical property, e.g., dispersion, comprises: modelling an object having the substrate and at least the first layer by means of a first model, optionally, adjusting the first model to the determined reference layer thickness and/or the at least one measurement result of the at least one measurement method based on THz radiation in relation to the first layer applied to the substrate, wherein an adjusted first model is obtained, and determining the at least one optical property on the basis of the first model and/or the adjusted first model.

In further exemplary embodiments, a modelling of the object by means of the first model can for example comprise the use of a dispersion function that can be pre-determined, for example of the type Drude-Lorentz, Cauchy, Sellmeier, Tauc-Lorentz, etc. In further exemplary embodiments, a fit, e.g., a pointwise fit, of the dispersion can be carried out.

In further exemplary embodiments, a plurality of starting parameters can for example be pre-determined for the dispersion function, for example on the basis of a priori knowledge in relation to the object and/or on the basis of the at least one measurement result from a preceding e.g., THz-based and/or non-THz-based measurement such as e.g., the reference layer thicknesses.

In further exemplary embodiments, a suitable dispersion can be manually selected at least periodically, for example. In further exemplary embodiments, a dispersion can be at least periodically automatically (without interaction with a person) selected, for example from a database, for example through trial.

In further exemplary embodiments, known dispersions for example of layers of the object that are not to be calibrated can optionally be used for the first model. In further exemplary embodiments, several possible dispersions can also be present per layer, for example, said dispersions being determined on the basis of preceding measurements, for example.

In further exemplary embodiments, optionally adjusting the first model can for example comprise at least one of the following elements: a) adjusting or fitting at least one, for example several, for example all of several measurement points, for example simultaneously, for example with a dispersion, b) adjusting or fitting at least one, for example several, for example all of several measurement points individually.

In further exemplary embodiments, in the variants presently described in exemplary form, there results a) for example in the case of a number of layers applied to the substrate equal to N and in the case of a number of measurement points equal to M (e.g., per layer), a dispersion per a number of possible combinations equal to K of the dispersions of the known (for example previously determined for example according to the exemplary embodiments) layers, for example.

In further exemplary embodiments, in the variant previously described in an exemplary manner, there results b) a number of dispersions equal to M per a number of possible combinations equal to K of the dispersions of the known (for example previously determined for example according to the exemplary embodiments) layers.

In further exemplary embodiments, the method further comprises: selecting, e.g., per layer, the best dispersion, and thus the dispersion of those previously determined for example that best fits the data determined via measurement technology, for example. In further exemplary embodiments, the selection can be made per layer, for example for at least one, for example several, for example all layers. For example, in some exemplary embodiments, a number of dispersions equal to (M+1)*K results e.g., per layer, wherein K characterises the number of possible combinations and wherein "*" represents a scalar multiplication operator.

In further exemplary embodiments, the selection of the dispersion comprises for example reducing the number of dispersions equal to (M+1)*K by using a variation calculation and by selecting for example according to one of the following criteria: accuracy, stability, fit.

In further exemplary embodiments, it is provided that the method comprises: carrying out at least one measurement in relation to an object having the substrate and the first layer by means of a measurement method based on reflection of THz radiation and/or at least one measurement method based on transmission of the THz radiation and/or at least one further measurement method, e.g., not based on THz radiation, for example at a number of points of the object equal to M, M>1, determining at least one optical property of the first layer on the basis of the at least one measurement.

In further exemplary embodiments, it is provided that the method further has at least one of the following elements: a) applying at least one further layer, for example to the first (or a previously applied) layer, b) carrying out at least one further measurement in relation to an object having the substrate and the first layer and the at least one further layer by means of a measurement method based on reflection of the THz radiation and/or at least one measurement method based on transmission of the THz radiation and/or at least one further measurement method, e.g., not based on THz radiation, e.g., at a number of points of the object equal to M, M>1 (e.g., the same points or measurement points as have been used for at least one measurement method in relation to the substrate and/or at least one other layer of the object), c) determining at least one optical property of the at least one further layer on the basis of the at least one further measurement.

Further exemplary embodiments relate to a device for carrying out the method according to the embodiments.

In further exemplary embodiments, it is provided that the device has at least one THz device for emitting and/or receiving THz radiation. In further exemplary embodiments, the at least one THz device can for example be designed to at least periodically a) carry out THz-based measurements in relation to the object in at least one transmission arrangement, in which the THz radiation at least periodically passes through at least some regions of the object and/or b) carry out THz-based measurements in relation to the object in at least one reflection arrangement, in which the THz radiation is at least periodically reflected at at least some regions of the object.

In further exemplary embodiments, it is provided that the device has at least one reflector for the THz radiation, wherein for example the device is designed to arrange the reflector at least periodically a) at least partially in a beam path of the THz radiation and/or b) in a region of at least one surface of the substrate or of an object having the substrate, for example having a spacing from the at least one surface that can be pre-determined. In this way, in further exemplary embodiments, different measurement configurations for the THz-based measurements in relation to the object can be provided, by means of which, in further exemplary embodiments, information can be determined to determine the at least one property of at least the first layer applied to the substrate.

Further exemplary embodiments relate to a computer-readable storage medium, comprising commands which, when executed by a computer, require said computer to carry out the method according to the embodiments.

Further exemplary embodiments relate to a computer program, comprising commands which, when executed by a computer, require said computer to carry out the method according to the embodiments.

Further exemplary embodiments relate to a data carrier signal that transmits and/or characterises the computer program according to the embodiments.

Further exemplary embodiments relate to a use of the method according to the embodiments and/or of the device according to the embodiments and/or of the computer-readable storage medium according to the embodiments and/or of the computer program according to the embodiments and/or of the data carrier signal according to the embodiments for at least one of the following elements: a) determining the at least one property of the first layer, b) determining the at least one property of the at least one further layer, c) calibrating a model and/or a device for THz measurements, for example for THz measurements of measured objects having several layers applied to a substrate, for example to determine layer thicknesses of the several layers applied to the substrate, d) broadening or altering calibration data for THz measurements.

Further features, possible uses and advantages of the invention result from the following description of exemplary embodiments of the invention that are depicted in the figures of the drawing. All the features described or depicted form the subject matter of the invention alone or in any combination, independently of how they are summarised in the claims or their back-references and independently of their formulation or depiction in the description or in the drawing.

In the drawing:

FIG. 1 schematically shows a flow diagram according to exemplary embodiments,

FIG. 2 schematically shows a flow diagram according to further exemplary embodiments, FIG. 3A schematically shows a side view of a substrate according to further exemplary embodiments, FIG. 3B schematically shows an aerial view of a substrate according to further exemplary embodiments, FIG. 4 schematically shows a flow diagram according to further exemplary embodiments, FIG. 5 schematically shows a flow diagram according to further exemplary embodiments, FIG. 6 schematically shows a flow diagram according to further exemplary embodiments, FIG. 7 schematically shows a flow diagram according to further exemplary embodiments, FIG. 8 schematically shows a flow diagram according to further exemplary embodiments, FIG. 9 schematically shows a flow diagram according to further exemplary embodiments, FIG. 10 schematically shows a flow diagram according to further exemplary embodiments, FIG. 11 schematically shows a flow diagram according to further exemplary embodiments, FIG. 12 schematically shows a flow diagram according to further exemplary embodiments, FIG. 13A schematically shows a flow diagram according to further exemplary embodiments, FIG. 13B schematically shows a flow diagram according to further exemplary embodiments, FIG. 14 schematically shows a block diagram according to further exemplary embodiments, FIG. 15 schematically shows a block diagram according to further exemplary embodiments, FIG. 16 schematically shows a block diagram according to further exemplary embodiments, FIG. 17A, 17B, 17C 17D respectively schematically show a substrate according to further exemplary embodiments, FIG. 18 schematically shows a block diagram according to further exemplary embodiments, FIG. 19 schematically shows a flow diagram according to further exemplary embodiments, FIG. 20 schematically shows aspects according to further exemplary embodiments, FIG. 21 schematically shows aspects according to further exemplary embodiments, FIG. 22 schematically shows aspects according to further exemplary embodiments, FIG. 23 schematically shows aspects according to further exemplary embodiments, FIG. 24 schematically shows aspects according to further exemplary embodiments, FIG. 25 schematically shows aspects according to further exemplary embodiments, FIG. 26 schematically shows aspects according to further exemplary embodiments, FIG. 27 schematically shows aspects according to further exemplary embodiments, FIG. 28 schematically shows aspects according to further exemplary embodiments, FIG. 29 schematically shows aspects according to further exemplary embodiments, FIG. 30 schematically shows aspects according to further exemplary embodiments, FIG. 31 schematically shows aspects according to further exemplary embodiments, FIG. 32 schematically shows aspects according to further exemplary embodiments, FIG. 33 schematically shows aspects according to further exemplary embodiments, FIG. 34 schematically shows aspects of uses according to further exemplary embodiments, and FIG. 35 schematically shows a simplified block diagram according to further exemplary embodiments.

Exemplary embodiments, see FIG. 1, 3, relate to a method for determining at least one property of at least one first layer 12-1 that can be applied to the substrate 10 using terahertz, THz, radiation, comprising: determining 100 (FIG. 1) at least one property E-10 of the substrate 10, applying 102 the first layer 12-1 to the substrate 10, determining 104 the at least one property E-12-1 of the first layer 12-1, and thus e.g. the layer applied to the substrate 10.

In further exemplary embodiments, the substrate 10 has a metallic base body or a non-metallic base body having a metallic (e.g., metallised) surface 10-a. In further exemplary embodiments, the substrate 10 has a non-metallic base body, wherein the base body for example has a plastic material.

In further exemplary embodiments, FIG. 2, it is provided that the method further comprises: applying 106-n at least one further, e.g., nth layer, 12-n, for example to the first layer 12-1 or a layer applied previously to the substrate 10, wherein for example n is a positive integer greater than or equal to two, and, optionally, determining 108-n at least one property E-12-n of the at least one further layer 12-n.

In further exemplary embodiments, applying the first layer 12-1 and/or the at least one further layer 12-n can for example comprise applying a liquid and/or gaseous medium to at least one (e.g., uncoated or already coated) surface 10a of the substrate 10, which forms the layer in question, for example, after the application.

In further exemplary embodiments, several layers can for example be applied to the substrate 10 or on top of one another by means of the application 102, 106-n, whereby, for example, a layer structure OBJ having the substrate 10 and the several layers 12-1, 12-2, 12-n results.

The substrate 10 can for example be a metallic substrate in further embodiments, on which a plurality of paint layers 12-1, 12-2, 12-n are applied. For example, a first paint layer 12-1 is applied to the surface of the substrate 10, for example a second paint layer 12-2 is applied to a surface 12-1-a of the first paint layer 12-1, etc. Optionally, in further exemplary embodiments, at least one further paint layer (not shown) can be applied to a surface 12-2-a of the second paint layer 12-2.

In further exemplary embodiments, FIG. 2, the method comprises: repeating 109 a) the application 106-n of the at least one further layer 12-n, and optionally b) the determination 108-n of at least one property E-12-n of the at least one further layer. In this way, one or several properties of a respective layer 12-1, 12-2, 12-n can successively be determined in an exemplary manner, wherein in further exemplary embodiments, interactions, for example, can also be accounted for in the region of border surfaces between layers 12-1, 12-2 bordering one another.

In further exemplary embodiments, the repetition 109 of the application of the at least one further layer is carried out until, for example, a pre-determined termination condition is satisfied. For example, the presence of a number of layers that can be pre-determined on the substrate 10 can characterise a termination condition.

In further exemplary embodiments, the THz radiation TS has at least one spectral component, for example several spectral components, in the range between 0.1 THz and 30 THz, for example between 0.3 THz and 10 THz.

In further exemplary embodiments, the at least one property E-10 of the substrate 10 and/or the first layer 12-1 and/or the at least one further layer 12-n has at least one of the following elements: a) optical properties, b) thickness D-10 (FIG. 3A), c) magnetic permeability, d) electrical conductivity, e) roughness.

In further exemplary embodiments, the optical properties are a dispersion for the THz radiation TS, for example. In further exemplary embodiments, the dispersion can be characterised by a refractive index n and an extinction coefficient e.

In further exemplary embodiments, determining 100 properties E-10 of the substrate 10 further comprises: determining 100a at least one surface property OE of a surface 10a of the substrate 10, wherein for example the at least one surface property OE has at least one of the following elements: a) roughness, b) shape, e.g., bend, c) spatial position (which can for example be characterised by a direction of a normal vector of the surface 10a, for example in relation to an optical axis of a THz device providing the THz radiation TS) (cf. e.g. block 210 from FIG. 14), d) structures, e.g., an arrangement of foreign material in the substrate 10 (e.g., metallic deposits in a plastic substrate) and/or a shaping of the surface 10a, e.g., structuring or micro-structuring.

In further exemplary embodiments, the at least one surface property OE is determined 100a for example by means of at least one of the following elements: a) confocal microscopy, b) interferometry, c) optical coherence tomography, d) three-dimensional imaging.

In further exemplary embodiments, FIG. 4, the method further comprises: using 110 at least one measurement method 110a based on reflection of the THz radiation TS-1 (FIG. 3A) and/or at least one measurement method 110b based on transmission of the THz radiation TS-2 (FIG. 3A), and/or at least one further measurement method, e.g. not based on THz radiation TS, e.g. a tactile measurement method 110c, for at least one of the following elements: a) determining 100 at least one property E-10 of the substrate, b) determining 104 the at least one property E-12-1 of the first layer, c) determining 108-n the at least one property E-12-n of the at least one further layer 12-n, d) determining 100a the at least one surface property OE of a surface 10a of the substrate 10.

In further exemplary embodiments, one or several of the measurement methods based on terahertz radiation specified in the following can for example be at least periodically used: a) THz spectroscopy, b) THz ellipsometry.

In further exemplary embodiments, FIG. 5, the method further comprises: varying 120 an orientation OR-10 of the substrate 10 or of an object OBJ having the substrate 10. For example, in further exemplary embodiments, several THz-based and/or non-THz-based measurement methods can be used for several measurements of the object OBJ, wherein the several measurements differ e.g., in relation to an orientation of the object OBJ (FIG. 3A) or substrate 10, for example relative to an optical axis of a or of the THz device 210 (FIG. 14). Information useful or that can be used for determining the at least one property can thus be determined for objects OBJ or substrates 10 or layers 12-1, 12-2, . . . having anisotropies.

In further exemplary embodiments, the method further comprises: varying 122 an angle of incidence EW-TS of the THz radiation, for example in relation to a normal vector of the surface 10a of the substrate 10 or a layer 12-1, 12-2, . . . arranged thereon.

In further exemplary embodiments, the method further comprises at least one of the following elements: a) varying 124 a polarisation POL-TS of the THz radiation, b) varying 126 a direction of passage DR-TS of the THz radiation, c) at least periodically reflecting 128 the THz radiation, for example by means of at least one mirror or reflector that can be introduced into a beam path of the THz radiation for at least some THz-based measurements.

In further exemplary embodiments, FIG. 6, the method further comprises: carrying out 130 at least one measurement method or the at least one measurement method for several measurement points, for example a number of measurement points MP equal to M, where M>1, wherein the several measurement points MP are for example assigned to different places on the surface 10a (FIG. 3A) of the substrate 10 or to a corresponding layer.

FIG. 3B shows an aerial view of an object OBJ having the substrate 10 in an exemplary form having M=8 measurement points MP1, MP2, . . . , MP8 in an exemplary form. An arrangement of the measurement points MP1, MP2, . . . , MP8 differing from the present arrangement shown in an exemplary form in FIG. 3B, substantially in a matrix, is also conceivable in other embodiments.

In further exemplary embodiments, in which several measurement points MP (e.g., the eight measurement points MP1, MP2, . . . , MP8 shown in an exemplary manner in FIG. 3B) are respectively used for the substrate 10 ("substrate measurement") and at least one layer 12-1 ("layer measurement") or for several layers 12-1, 12-2, . . . , the same measurement points MP are preferably used in relation to the substrate 10 and/or the respective layer(s) 12-1, 12-2, . . . , which can increase precision. In further exemplary embodiments, the same measurement points can respectively be used for all measurements, for example.

In further exemplary embodiments, several, e.g., different types of THz-based (and optionally also not THz-based) measurements can also respectively be carried out for the measurement points.

In further exemplary embodiments, the method further comprises: combining 132 measurement results of several measurement points MP of a measurement method, for example the number of measurement points equal to M. In further exemplary embodiments, for example, the measurements results of several measurement points MP of at least one measurement method (e.g., for the substrate 10 and/or at least one layer 12-1) can be used as input data for a model MOD to determine the at least one property E-12-1.

The combination 132 can for example be understood in the sense of a combinatorial evaluation, for example comprising combining, for example aggregating e.g., measurement results to determine a variant of an optical property of a layer, which describes several, for example all, the measurement results, for example, e.g., by means of the model MOD, e.g., simultaneously, e.g., correctly.

In further exemplary embodiments, the method can comprise: an evaluation of the results, for example measurement results, for example by means of the model MOD, and/or on the basis of a comparison with further measurements, for example reference measurements.

In further exemplary embodiments, FIG. 7, the method further comprises: determining 140 at least one reference layer thickness RD-1, RD-1-1, . . . , for example of a number of reference layer thicknesses $RD1_1$, $RD1_2$, . . . , $RD1_M$ equal to M (M>=1) of the first layer 12-1, for example at a number of measurement points MP equal to M.

In further exemplary embodiments, the same or at least some of the same measurement points, for example, are used to determine 140 the number of reference layer thicknesses $RD1_1$, $RD1_2$, . . . , $RD1_M$ equal to M of the first layer 12-1 as are also used for the substrate measurement (in particular, for example, also a THz-based substrate measurement) and/or the at least one layer measurement (in particular, for example, also a THz-based layer measurement, e.g., at the at least one further layer 12-2).

In further exemplary embodiments, the method further comprises: determining 142 at least one reference layer thickness RD-n, for example a number of reference layer thicknesses $RDn_1$, $RDn_2$, . . . , $RDn_M$ equal to M, of the at least one further, e.g. nth layer, for example at a number of measurement points equal to M.

In further exemplary embodiments, the same or at least some of the same measurement points, for example, are used to determine 142 the number of reference layer thicknesses equal to M of the at least one further layer as are also used for the substrate measurement (in particular, for example, also a THz-based substrate measurement) and/or the at least one layer measurement (in particular, for example, also a THz-based layer measurement or several other or all layer measurements).

In further exemplary embodiments, the determination 140 of the at least one reference layer thickness of the first layer and/or the determination 142 of the at least one reference layer thickness of the at least one further layer is carried out on the basis of one or the one further measurement method, e.g. not based on THz radiation, e.g. tactile measurement method. For example, the measurement method not based on THz radiation can have at least one of the following elements: a) visual analysis of a micrograph, b) tactile measurement, c) optical measurement e.g., confocal microscopy and/or interferometry and/or optical coherence tomography and/or three-dimensional imaging.

In further exemplary embodiments, the determination 140 (FIG. 7) of the at least one reference layer thickness of the first layer 12-1 is carried out after the application of the first layer 12-1 to the substrate 10. In further exemplary embodiments, the determination 142 of the at least one reference layer thickness of the at least one further layer 12-2 is carried out after the application of the at least one further layer 12-2 (e.g., to the first layer 12.1), for example after all the layers provided have been applied.

In further exemplary embodiments, it is provided that a) the carrying out of the at least one measurement method 110a, 110b, 110c (FIG. 4) for several measurement points, for example for a number of measurement points equal to M, where M>1, and/or b) the determination of the at least one reference layer thickness, for example of a number of reference layer thicknesses equal to M, of the first layer, for example at the number of measurement points equal to M, and/or c) the determination of the at least one reference layer thickness, for example of a number of reference layer thicknesses equal to M, of the at least one further layer is respectively carried out for the same number of measurement points MP-1, MP-2, ..., MP-M (e.g., MP-8), for example equal to M.

In further exemplary embodiments, the method further comprises: specifying 144 and/or accounting for 145 deviations for the at least one reference layer thickness. Possible deviations (e.g., due to a finite measurement precision of a measurement method used) of the at least one reference layer thickness RD-1 from an actual layer thickness of the layer 12-1 in question can thus be accounted for, e.g., to determine 104 (FIG. 1) the at least one property E-12-1 of the first layer 12-1.

In further exemplary embodiments, specifying 144 and/or accounting for 145 deviations for the at least one reference layer thickness comprises providing a layer thickness region, which can for example be characterised by two layer thickness values, and can for example be selected such that the reference layer thickness, for example determined by measurement technology, lies in an interval that can be characterised by the layer thickness region.

In further exemplary embodiments, specifying and/or accounting for deviations for the at least one reference layer thickness can for example be respectively carried out for several measurement points, for example all measurement points MP1, MP2, ..., MP8.

If, for example, a value $RD1_1$ is obtained as a reference layer thickness for the first layer 12-1 (FIG. 3A) in a first measurement point MP1 (FIG. 3B), the layer thickness region previously described in an exemplary manner can for example be characterised by the two layer thickness values $RD1_1-\Delta RD1$, $RD1_1+\Delta RD1$, wherein the parameter $\Delta RD1$ can for example be selected on the basis e.g., of a known measurement precision in relation to the measurement of the reference layer thickness $RD1_1$. In further exemplary embodiments, the same procedure can be undertaken in a comparable manner for further measurement points MP2, MP3, ..., and their respectively assigned reference layer thicknesses $RD1_2$, $RD1_3$, ..., e.g., by specifying corresponding layer thickness regions $RD1_2-\Delta RD1$, $RD1_2+\Delta RD1$, $RD1_3-\Delta RD1$, $RD1_3+\Delta RD1$, ....

In further exemplary embodiments, several of the variants that can for example be used for a variation calculation can be determined or generated on the basis of the corresponding layer thickness regions $RD1_2-\Delta RD1$, $RD1_2+\Delta RD1$, $RD1_3-\Delta RD1$, $RD1_3+\Delta RD1$, ....

In further exemplary embodiments, several variants e.g., of an optical property of a layer, e.g. dispersion, can for example be determined or formed by variation of thickness specifications of the layer within the layer thickness region previously specified in an exemplary manner.

In further exemplary embodiments, FIG. 8, the method further comprises: determining 150 at least one optical property OE-12-1, for example a dispersion, of the first layer 12-1 on the basis of a) at least one measurement result ME-TS-12-1 of at least one measurement method based on THz radiation TS, TS-1, TS-2 in relation to the first layer 12-1 applied to the substrate 10 and optionally on the basis of b) at least one or the at least one reference layer thickness RD-1. In further exemplary embodiments, both the at least one measurement result ME-TS-12-1 of the at least one measurement method based on terahertz radiation in relation to the first layer 12-1 applied to the substrate 10 and the at least one reference layer thickness RD1 are used to determine 150 the at least one optical property OE-12-1 of the first layer 12-1.

In further exemplary embodiments, the measurement result ME-TS-12-1 for example has several values, for example corresponding to the several measurement points MP1, ..., MP8. The same applies in the case of further advantageous embodiments for the reference layer thickness RD-1. In other words, in further exemplary embodiments, the determination 150 can be carried out on the basis of several measurement points MP1, MP2, ..., MP8 for the measurement result ME-TS-12-1 and on the basis of several reference layer thicknesses $RD-1_1$, $RD-1_2$, ..., $RD1_8$ for the several measurement points MP1, MP2, ..., MP8.

In further exemplary embodiments, the method further comprises: determining 152 at least one optical property OE-12-2, OE-12-n of the at least one further layer 12-2, 12-n on the basis of a) at least one measurement result ME-TS-12-2, ME-TS-12-n (e.g., also respectively in turn for several measurement points MP) of at least one measurement method based on THz radiation in relation to the at least one further layer 12-2, 12-n and optionally on the basis of b) at least one or the at least one reference layer thickness RD-2, RD-n, ... of the at least one further layer. In further exemplary embodiments, both the at least one measurement result ME-TS-12-2, ME-TS-12-n of the at least one measurement method based on terahertz radiation and the at least one reference layer thickness RD-2, RD-n, ... of the at least one further layer 12-2, 12-n are used to determine 152 the at least one optical property OE-12-2, OE-12-n of the at least one further layer 12-2, 12-n.

In further exemplary embodiments, it is provided that the determining 152 of the at least one optical property of the at least one further layer 12-2 is additionally carried out on the basis of at least one reference layer thickness and/or at least one optical property of at least one layer 12-1 applied to the substrate 10 before the at least one further layer 12-2 and/or on the basis of at least one property E-10 of the substrate 10. In this way, in further exemplary embodiments, information in relation to at least one layer 12-1 previously applied to the substrate 10 can advantageously also be used to determine the at least one optical property of the at least one further layer 12-2.

In further exemplary embodiments, FIG. 9, it is provided that the determining of the at least one optical property, for example the dispersion, comprises: modelling 1500 an object OBJ having the substrate 10 and at least the first layer 12-1 by means of a first model MOD-1, optionally, adjusting 1502 the first model MOD-1 to the determined reference layer thickness RD-1, RD-2, ... and/or the at least one measurement result ME-TS-12-1 of the at least one measurement method based on THz radiation in relation to the first layer 12-1 applied to the substrate 10, wherein an adjusted first model MOD-1' is obtained, and determining 1504 the at least one optical property OE-12-1, OE-12-2, OE-12-n on the basis of the first model MOD-1 and/or the adjusted first model MOD-1'.

In further exemplary embodiments, a modelling 1500 of the object OBJ by means of the first model MOD-1 can for example comprise the use of a dispersion function DF that can be pre-determined, for example of the type Drude-Lorentz, Cauchy, Sellmeier, Tauc-Lorentz, etc. In further exemplary embodiments, a fit, e.g., a pointwise fit of the dispersion can be carried out.

In further exemplary embodiments, a plurality of starting parameters can for example be pre-determined for the dispersion function DF, for example on the basis of a priori knowledge in relation to the object OBJ and/or on the basis of the at least one measurement result ME-TS-12-1 from a previous, for example THz-based and/or non-THz-based, measurement such as the reference layer thicknesses.

In further exemplary embodiments, a suitable dispersion can be manually selected at least periodically, for example. In further exemplary embodiments, a dispersion can be at least periodically automatically (without interaction with a person) selected, for example from a database, for example through trial.

In further exemplary embodiments, known dispersions for example of layers of the object OBJ that are not to be calibrated can optionally be used for the first model MOD-1. In further exemplary embodiments, several possible dispersions can also be present per layer, for example, said dispersions having been determined on the basis of previous measurements, for example.

In further exemplary embodiments, optionally adjusting 1502 the first model MOD-1, for example can comprise at least one of the following elements: a) adjusting or fitting at least one, for example several, for example all of several measurement points, for example simultaneously, for example with a dispersion ("aspect 1"), b) adjusting or fitting at least one, for example several, for example all of several measurement points individually ("aspect 2").

In further exemplary embodiments, in the variants previously described in exemplary form, there results a) for example in the case of a number of layers applied to the substrate 10 (FIG. 3A) equal to N and in the case of a number of measurement points equal to M (e.g., per layer), a dispersion per a number of possible combinations equal to K of the dispersions of the known (for example previously determined for example according to the embodiments) layers, for example.

In further exemplary embodiments, in the variant previously described in an exemplary manner, there results b) a number of dispersions equal to M per a number of possible combinations equal to K of the known (for example previously determined for example according to the embodiments) layers.

In further exemplary embodiments, the method further comprises: selecting, e.g., per layer, e.g., for several, e.g., all layers, the best dispersion, and thus the dispersion of those previously determined that best fits the data determined via measurement technology, for example. For example, in some exemplary embodiments, a number of dispersions equal to (M+1)*K results e.g., per layer, e.g., for several, e.g., for all layers, wherein K characterises the number of possible combinations and wherein "*" represents a scalar multiplication operator.

In further exemplary embodiments, the selection of the dispersion comprises for example reducing the number of dispersions equal to (M+1)*K by using a variation calculation and by selecting for example according to one of the following criteria: accuracy, stability, fit. In further exemplary embodiments, the first model MOD-1, for example, can be adjusted, e.g., on the basis of the selected dispersions (e.g., per layer).

In further exemplary embodiments, FIG. 10, it is provided that the method comprises: optionally providing 160 a sample, wherein the sample has an object OBJ, for example, and carrying out 162 at least one measurement M-1 in relation to an object OBJ having the substrate 10 and the first layer 12-1 by means of a measurement method based on reflection of the THz radiation TS and/or at least one measurement method based on transmission of the THz radiation TS and/or at least one further measurement method, e.g., not based on THz radiation TS, e.g., at a number of points equal to M, M>1, of the object OBJ (see e.g., the measurement points MP1, MP2, . . . from FIG. 3B), determining 164 at least one optical property OE-12-1 of the first layer 12-1 on the basis of the at least one measurement M-1.

In further exemplary embodiments, it is provided that the method further comprises at least one of the following elements: a) applying 166 at least one further layer 12-2, 12-n, for example to the first (or a previously applied) layer 12-1, b) carrying out 168 at least one further measurement M-2, M-n in relation to an object OBJ having the substrate 10 and the first layer 12-1 and the at least one further layer 12-2, 12-n by means of a measurement method based on reflection of the THz radiation and/or at least one measurement method based on transmission of the THz radiation and/or at least one further measurement method, e.g., not based on THz radiation, e.g., at a number of points of the object equal to M, M>1 (see for example the measurement points MP1, MP2, . . . from FIG. 3B), c) determining 169 at least one optical property OE-12-2, OE-12-n of the at least one further layer on the basis of the at least one further measurement M-2.

In further exemplary embodiments, the optional provision 160 (FIG. 10), 1600 (FIG. 11) of a sample comprises at least one of the following elements: a) providing the sample having a single layer, and thus for example in the form of the substrate 10 having the first layer 12-1 applied thereon, b) providing the sample having several coats, and thus for example in the form of the substrate 10 having several layers 12-1, 12-2, . . . applied thereon.

In further exemplary embodiments, FIG. 12, the carrying out 162 (FIG. 10) of at least one measurement has for example at least one of the following elements: a) carrying out 1662 THz-based measurements, and thus using THz radiation TS, for example THz radiation TS-1 at least partially reflected on the object OBJ, and/or for example THz radiation TS-2 at least partially transmitted by the object OBJ and/or b) carrying out 1624 at least one measurement method not based on THz radiation, e.g., a) visual analysis of a micrograph, b) tactile measurement, c) optical measurement, e.g., confocal microscopy and/or interferometry and/or optical coherence tomography and/or three-dimensional imaging.

In further exemplary embodiments, FIG. 13A, determining 1640 the at least one optical property OE-12-1 (e.g. a dispersion for the THz radiation TS, TS-1, TS-2) of the at least one layer 12-1 comprises: modelling 1642 the sample or the object OBJ by means of a or the model, optionally adjusting 1644 the model, selecting 1646 a best dispersion.

In further exemplary embodiments, the modelling 1642 comprises at least one of the following elements: a) using known dispersions, e.g., of the layer(s) not to be calibrated (several dispersions per layer can also be present, for example), b) using reference layer thicknesses from reference measurements, c) optionally determining the layer thickness regions, d) adopting a dispersion function (e.g., of the type Drude-Lorentz, Cauchy, Sellmeier, Tauc-Lorentz, . . . ), e.g., having starting parameters, or using a pointwise fit of the dispersion, optionally e) manually selecting a suitable dispersion or automatically selecting from a database, e.g. through trial.

FIG. 13B schematically shows a flow diagram according to further exemplary embodiments. The method comprises: determining 1040 several variants VAR-OE of the at least one, e.g. optical, property E-12-1 of the first layer and/or at least one further layer or the at least one further layer, for example on the basis of measurement results in relation to the different measurement points and/or the corresponding layer thickness regions RD12−ΔRD1, RD12+ΔRD1, RD13−ΔRD1, RD13+ΔRD1, . . . and, optionally, determining 1042 a particular variant VAR-OE' of the several variants VAR-OE, for example by means of a variation calculation, e.g., in the sense of an algorithmic optimisation for selecting a (e.g. best according to a criteria that can be pre-determined) variant, cf. the layer thickness regions previously described in an exemplary manner. In further exemplary embodiments, several of the variants that can for example be used for a variation calculation can be determined or generated, for example on the basis of corresponding layer thickness regions RD12−ΔRD1, RD12+ΔRD1, RD13−ΔRD1, RD13+ΔRD1, . . . . In further exemplary embodiments, in the previously described variant, there results a) for "aspect 1", for example in the case of a number of layers applied to the substrate 10 (FIG. 3A) equal to N and in the case of a number of measurement points equal to M (e.g., per layer), for example, a dispersion per a number of possible combinations equal to K of the dispersions of the known (e.g., previously determined, for example according to the embodiments) layers. In further exemplary embodiments, in the case of the variant previously described in an exemplary manner, there results b) for "aspect 2", a number of dispersions equal to M per a number of possible combinations of the dispersions equal to K of the known (e.g. previously determined, for example according to the embodiments) layers.

In further exemplary embodiments, several variants VAR-OE (FIG. 13B) of the properties, e.g. optical properties, e.g., dispersions, can for example be determined for one, several or all layers of an object OBJ (FIG. 3A). In further exemplary embodiments, a particular variant of the (e.g., optical) properties can respectively be determined or selected, e.g., for each layer, on the basis of these variants, for example by means of a variation calculation. In further exemplary embodiments, the selection can for example be made according to at least one of the following criteria: accuracy (e.g., able to be characterised by agreement with measurement data of further/other measurement methods, e.g. tactile reference measurements and/or micrographs or other THz-based methods), stability, fit (e.g., able to be characterised by agreement of values that can be modelled on the basis of the selected particular variant(s) with measurement values, which are for example determined by means of the THz-based measurement method(s)).

Further exemplary embodiments, FIG. 14, relate to a device 200 for carrying out the method according to the embodiments. The device 200 has a computer device ("computer") 202, a storage device 204 assigned to the computer device 202 for at least periodically saving at least one of the following elements: a) data DAT, b) computer program PRG, in particular for carrying out a method according to the embodiments.

In further exemplary embodiments, the storage device 204 has a volatile memory (e.g., working memory (RAM)) 204*a*, and/or a non-volatile memory (e.g., flash EEPROM) 204*b*.

In further exemplary embodiments, the computer device 202 has at least one of the following elements: microprocessor (μP), microcontroller (μC), application-specific integrated circuit (ASIC), system on chip (SoC), programmable logic component (e.g., FPGA, field programmable gate array), hardware connection, or any combination hereof.

Further exemplary embodiments relate to a computer-readable storage medium SM, comprising commands PRG which, when executed by a computer 202, require said computer to carry out the method according to the embodiments.

Further exemplary embodiments relate to a computer program PRG, comprising commands which, when executed by a computer 202, require said computer to carry out the method according to the embodiments.

Further exemplary embodiments relate to a data carrier signal DCS that transmits and/or characterises the computer program PRG according to the embodiments. The data carrier signal DCS can be received for example via an optional data interface 206 of the device 202.

In further exemplary embodiments, it is provided that the device 200 has at least one THz device 210 for emitting and/or receiving THz radiation TS. In further exemplary embodiments, the at least one THz device 210 can for example be designed to at least periodically a) carry out THz-based measurements in relation to the object or the substrate 10 in at least one transmission arrangement, in which the THz radiation at least periodically passes through at least some regions of the object and/or b) carry out THz-based measurements in relation to the object in at least one reflection arrangement, in which the THz radiation is at least periodically reflected at at least some regions of the object.

FIG. 15 shows, in an exemplary manner, a schematic block diagram of a configuration 210*a* of the THz device 210 according to exemplary embodiments, which is designed, for example, for THz-based measurements with at least one reflection TSR of the THz radiation TS at the substrate or object 10. Block 211 symbolises a THz transmitter for transmitting the THz radiation TS, and block 212 symbolises a THz detector for receiving the reflected THz radiation TSR. A reflector or mirror 215 can optionally be provided, which can be at least periodically introduced into the beam path of the THz radiation TS or near at least one surface 10-*b* of the subject or object, for example in a spacing D, wherein in further exemplary embodiments, the spacing D can be pre-determined as zero, such that, for example, a technical zero gap is created between the reflector 215 and the surface 10-*b*.

FIG. 16 shows, in an exemplary manner, a schematic block diagram of a configuration 210*b* of the THz device 210 according to exemplary embodiments which, for example, is designed for THz-based measurements with at least one transmission TS' of the THz radiation TS through the substrate or object 10. The components 211', 212' from FIG. 16 correspond, for example, to the components 211, 212 from FIG. 15.

FIG. 17A to 17D respectively schematically show a substrate according to further exemplary embodiments in different states. FIG. 17A shows the substrate 10 in an initial state in which, for example, it is not yet coated. FIG. 17B shows the substrate 10 in a state in which the first layer 12-1 has been applied to the surface 10*a* of the substrate 10. FIG. 17*c* shows the substrate 10 in a state in which a second layer 12-2 has been applied to the substrate 10 or the first layer 12-1. FIG. 17D shows the substrate 10 in a state in which a third layer 12-3 has been applied to the substrate 10 or the second layer 12-2.

FIG. 18 schematically shows a block diagram according to further exemplary embodiments which, by means of block arrows $S_{1-M}$, $T1L_{1-M}$, $T2L_{1-M}$, $T3L_{1-M}$, indicates different measurements in relation to the substrate 10 ("substrate measurement") according to FIG. 17 or in relation to the layer(s) 12-1, 12-2, 12-3 applied thereon ("layer measurement"), or in relation to the object formed by the substrate 10 and the layer(s) 12-1, 12-2, 12-3 applied thereon.

In further exemplary embodiments, several measurement points, e.g., a number of measurement points equal to M, are respectively used both for the substrate measurement $S_{1-M}$ and for the layer measurements, $T1L_{1-M}$, $T2L_{1-M}$, $T3L_{1-M}$, wherein for example the number of measurement points equal to M are selected to be identical for several, for example all, measurements $S_{1-M}$, $T1L_{1-M}$, $T2L_{1-M}$, $T3L_{1-M}$. In the case of further exemplary embodiments, similar also applies for a measurement of the reference layer thicknesses. In further exemplary embodiments, the layer measurement $T3L_{1-M}$ can also be described as an entire stack measurement for the configuration according to FIG. 17D, for example, because said layer measurement relates to a complete layer stack having the substrate 10 and the presently three layers 12-1, 12-2, 12-3 as an example.

In further exemplary embodiments, the substrate measurements $S_{1-M}$ for the substrate 10 (FIG. 17A) starting from a number of measurement points MP (FIG. 3B) where M=8 in an example can for example have the following measurement results: $S1_1$, $S1_2$, $S1_3$, $S1_4$, $S1_5$, $S1_6$, $S1_7$, $S1_8$. As soon as the substrate measurements $S_{1-M}$ have been carried out, in further exemplary embodiments, the first layer 12-1 can be applied to the surface 10a of the substrate 10. In further exemplary embodiments, the layer measurements $T1L_{1-M}$ can then be carried out for the configuration of the substrate 10 having the first layer 12-1 (FIG. 17B), and optionally the measurement(s) of the reference layer thickness $RD1_{1-M}$.

In further exemplary embodiments, the layer measurements $T1L_{1-M}$ for the configuration of the substrate 10 having the first layer 12-1 (FIG. 17B), starting from a number of measurement points MP (FIG. 3B) where M=8 in an example, can for example have the following measurement results: $T1L_1$, $T1L_2$, $T1L_3$, $T1L_4$, $T1L_5$, $T1L_6$, $T1L_7$, $T1L_8$.

As soon as the layer measurements $T1L_{1-M}$ for the configuration of the substrate 10 having the first layer 12-1 (FIG. 17B) have been carried out, in further exemplary embodiments, the second layer 12-2 can be applied to the substrate 10 or the first layer 12-1. In further exemplary embodiments, the layer measurements $T2L_{1-M}$ can then, and thus after the application of the second layer 12-2, be carried out for the configuration of the substrate 10 having the first layer 12-1 and the second layer 12-2 (FIG. 17C), and optionally the measurement(s) of the reference layer thickness $RD1_{1-M}$ and/or $RD2_{1-M}$.

In further exemplary embodiments, the layer measurements $T2L_{1-M}$ for the configuration of the substrate 10 having the first layer 12-1 and the second layer 12-2 (FIG. 17C), starting from the number of measurement points MP (FIG. 3B) where M=8 in an example can for example have the following measurement results: $T2L_1$, $T2L_2$, $T2L_3$, $T2L_4$, $T2L_5$, $T2L_6$, $T2L_7$, $T2L_8$.

As soon as the layer measurements $T2L_{1-M}$ for the configuration of the substrate 10 having the first layer 12-1 and the second layer 12-2 (FIG. 17C) have been carried out, in further exemplary embodiments, the third layer 12-3 can be applied to the substrate 10 or the second layer 12-2. In further exemplary embodiments, the layer measurements $T3L_{1-M}$ can then, and thus after the application of the third layer 12-3, be carried out for the configuration of the substrate 10 having the first layer 12-1 and the second layer 12-2 and the third layer 12-3 (FIG. 17D), and optionally the measurement(s) of the reference layer thickness $RD1_{1-M}$ and/or $RD2_{1-M}$ and/or $RD3_{1-M}$.

In further exemplary embodiments, the layer measurements $T3L_{1-M}$ for the configuration of the substrate 10 having the first layer 12-1 and the second layer 12-2 and the third layer 12-3 (FIG. 17D) ("entire pile" or entire stack), starting from the number of measurement points MP (FIG. 3B) where M=8 in an example, can for example have the following measurement results: $T3L_1$, $T3L_2$, $T3L_3$, $T3L_4$, $T3L_5$, $T3L_6$, $T3L_7$, $T3L_8$.

In further exemplary embodiments, each of the measurement results previously specified in an exemplary manner $T1L_1$, $T1L_2$, $T1L_3$, $T1L_4$, $T1L_5$, $T1L_6$, $T1L_7$, $T1L_8$, $T2L_1$, $T2L_2$, $T2L_3$, $T2L_4$, $T2L_5$, $T2L_6$, $T2L_7$, $T2L_8$, $T3L_1$, $T3L_2$, $T3L_3$, $T3L_4$, $T3L_5$, $T3L_6$, $T3L_7$, $T3L_8$, $S1_1$, $S1_2$, $S1_3$, $S1_4$, $S1_5$, $S1_6$, $S1_7$, $S1_8$ can for example be obtained by at least one of the following methods: a) a measurement method 110a based on reflection of the THz radiation TS, TS-1, b) a measurement method 110b based on transmission of the THz radiation TS, TS-2, c) a further measurement method 110c, e.g., not based on THz radiation TS, e.g., tactile or optical measurement method.

In further exemplary embodiments, reference layer thicknesses, for example respectively a number equal to M of reference layer thicknesses $RD1_{1-M}$, $RD2_{1-M}$, $RD3_{1-M}$, for each of the three layers 12-1, 12-2, 12-3 are optionally determined for at least one of the three layers 12-1, 12-2, 12-3, for example for all three layers, as already previously mentioned, for example by means of a tactile and/or optical measurement method or the like. In further exemplary embodiments, the determination the respective reference layer thickness of a corresponding layer can for example be carried out after the application of the layer in question and/or after the application of at least one further layer.

In further exemplary embodiments, the measurements of the reference layer thickness $RD1_{1-M}$ for the first layer 12-1 (FIG. 17B), starting from the number of measurement points MP where M=8 in an example, can for example have the following measurement results: $RD1_1$, $RD1_2$, $RD1_3$, $RD1_4$, $RD1_5$, $RD1_6$, $RD1_7$, $RD1_8$. In further exemplary embodiments, the measurements of the reference layer thickness $RD2_{1-M}$ for the second layer 12-2 (FIG. 17C), starting from the number of measurement points MP where M=8 in an example, can for example have the following measurement results: $RD2_1$, $RD2_2$, $RD2_3$, $RD2_4$, $RD2_5$, $RD2_6$, $RD2_7$, $RD2_8$. In further exemplary embodiments, the measurements of the reference layer thickness $RD3_{1-M}$ for the third layer 12-3 (FIG. 17D), starting from the number of measurement points MP where M=8 in an example, can for example have the following measurement results: $RD3_1$, $RD3_2$, $RD3_3$, $RD3_4$, $RD3_5$, $RD3_6$, $RD3_7$, $RD3_8$.

In further exemplary embodiments, possible deviations of the reference layer thickness can be accounted for by pre-determining layer thickness regions, for example to reflect a final measurement precision of the reference layer thicknesses.

For example, for the reference layer thickness $RD_1$ of the first layer 12-1 in the first measurement point MP1 (FIG. 3B), a layer thickness region can be characterised by the two layer thickness values $RD1_1-\Delta RD1$, $RD1_1+\Delta RD1$, wherein the parameter $\Delta RD1$ can for example be selected on the basis of a for example known measurement precision in relation to the measurement of the reference layer thickness $RD1_1$. Similarly, in further exemplary embodiments, a layer thickness region for the reference layer thickness $RD1_2$ of the first layer 12-1 can be pre-determined at a second measurement point MP2 as follows: $RD1_2-\Delta RD1$, $RD1_2+\Delta RD1$, etc.

In further exemplary embodiments, layer thickness regions can be pre-determined for the reference layer thicknesses $RD2_{1-M}$, $RD3_{1-M}$ of the further layers 12-2, 12-3 in a comparable manner.

In further exemplary embodiments, one or several values characterising a dispersion of the terahertz radiation TS in the first layer 12-1 are selected on the basis of the substrate measurements $S_{1-M}$ and layer measurements $T1L_{1-M}$, and optionally on the basis of the reference layer thicknesses $RD1_{1-M}$ or the corresponding reference thickness regions, for example on the basis of a first model that characterises the configuration according to FIG. 17B, e.g., for the refractive index and/or the extinction coefficient, which, in further exemplary embodiments, can for example be carried out after the application of the first layer and carrying out the corresponding layer measurement(s) and/or at a later point in time (for example after applying at least one further layer). In further exemplary embodiments, a vector or a matrix is for example determined for each of the number of measurement points equal to M, which characterises the dispersion via a plurality of values, e.g., for the refractive index and/or the extinction coefficients.

For example, in further exemplary embodiments, a first vector v1 can have a number of values for the refractive index, wherein each value for the refractive index is associated with another frequency of the THz radiation.

For example, in further exemplary embodiments, a second vector v2 can have a number of values for the extinction coefficients, wherein each value for the extinction coefficients is associated with another frequency of the THz radiation.

In further exemplary embodiments, a value for the dispersion in the case of a frequency of the THz radiation that can be pre-determined can for example be characterised by a 2-tuple (n, e) having a refractive index n and an extinction coefficient e in the case of the frequency that can be pre-determined.

For example, the dispersion that can be determined for the first measurement point MP1 of the first layer 12-1 can be described by a vector v3 of 2-tuples $(n1_1, e1_1)$, the dispersion that can be determined for the second measurement point MP2 of the first layer 12-1 can be described by a vector of 2-tuples $(n1_2, e1_2)$, etc., wherein for example each vector k has many 2-tuples (e, n), wherein k characterises a frequency index.

In further exemplary embodiments, for example after the application of the second layer 12-2 and the carrying out of at least one layer measurement $T2L_{1-M}$ based on the substrate measurements $S_{1-M}$ and the layer measurements, $T1L_{1-M}$, $T2L_{1-M}$, and optionally based on the reference layer thicknesses $RD1_{1-M}$, $RD2_{1-M}$ or the corresponding reference layer thickness regions, for example based on a model that characterises the configuration according to FIG. 17C, one or several values are determined for a dispersion of the terahertz radiation TS in the second layer 12-2.

In further exemplary embodiments, a "value" for the dispersion of the second layer 12-2 is for example determined for each of the number of measurement points equal to M, wherein the "value" for the dispersion of a respective measurement point can for example be characterised by the first and/or second vector v1, v2 or the vector v3 previously described in an exemplary manner. For example, the dispersion that can be determined for the first measurement point MP1 of the second layer 12-2 can be described by the 2-tuple $(n2_1, e2_1)$, the dispersion that can be determined for the second measurement point MP2 of the second layer 12-2 can be described by the 2-tuple $(n2_2, e2_2)$, etc.

In further exemplary embodiments, as previously mentioned, several dispersions (or "values" for the dispersions) per measurement point are also conceivable, for example for several different (e.g., respectively constant) layer thicknesses. In further exemplary embodiments, for example after the application of the third layer 12-3 and the carrying out of at least one layer measurement $T3L_{1-M}$ based on the substrate measurements $S_{1-M}$ and the layer measurements, $T1L_{1-M}$, $T2L_{1-M}$, $T3L_{1-M}$ and optionally based on the reference layer thicknesses $RD1_{1-M}$, $RD2_{1-M}$, $RD3_{1-M}$ or the corresponding reference layer thickness regions, for example based on a third model that characterises the configuration according to FIG. 17D, one or several values (for example respectively able to be characterised by the first and/or second vectors v1, v2 or the vector v3 previously described in an exemplary manner) are determined for a dispersion of the terahertz radiation TS in the third layer 12-3.

In further exemplary embodiments, a "value" (for example respectively able to be characterised by the first and/or second vectors v1, v2 or the vector v3 previously described in an exemplary manner) for the dispersion of the third layer 12-3 is determined for each of the number of measurement points equal to M, for example. For example, the dispersion that can be determined for the first measurement point MP1 of the third layer 12-3 can be described by the 2-tuple $(n3_1, e3_1)$, the dispersion that can be determined for the second measurement point MP2 of the third layer 12-3 can be described by the 2-tuple $(n3_2, e3_2)$, etc.

In further exemplary embodiments, a further dispersion (for example respectively able to be characterised by the first and/or second vectors v1, v2 or the vector v3 previously described in an exemplary manner) can also be determined, for example by adjusting several or all measurement points simultaneously.

In further exemplary embodiments, a respective dispersion, for example per layer, of at least one, for example all layers 12-1, 12-2, 12-3 can be determined on the basis of the measurement results $S1_1$, $S1_2$, $S1_3$, $S1_4$, $S1_5$, $S1_6$, $S1_7$, $S1_8$, $T1L_1$, $T1L_2$, $T1L_3$, $T1L_4$, $T1L_5$, $T1L_6$, $T1L_7$, $T1L_8$, $T2L_1$, $T2L_2$, $T2L_3$, $T2L_4$, $T2L_5$, $T2L_6$, $T2L_7$, $T2L_8$, $T3L_1$, $T3L_2$, $T3L_3$, $T3L_4$, $T3L_5$, $T3L_6$, $T3L_7$, $T3L_8$, $RD1_1$, $RD1_2$, $RD1_3$, $RD1_4$, $RD1_5$, $RD1_6$, $RD1_7$, $RD1_8$, $RD2_1$, $RD2_2$, $RD2_3$, $RD2_4$, $RD2_5$, $RD2_6$, $RD2_7$, $RD2_8$, $RD3_1$, $RD3_2$, $RD3_3$, $RD3_4$, $RD3_5$, $RD3_6$, $SRD3_7$, $RD3_8$ determined as previously described. In further exemplary embodiments, an optimisation or variation calculation can be carried out for this purpose, for example via the previously specified measurement results and/or measurement results based on other measurements, for example on e.g. THz-based (and/or non-THz-based) measurements of other layer stacks or objects, e.g., from a production or serial production of a component.

In further exemplary embodiments, an automatic and/or manual pre-selection of possible dispersions can respectively be made for example for at least one, for example for all of the observed layers.

In further exemplary embodiments, a measurement result or a determined dispersion of the first or at least one preceding layer is advantageously used to determine the dispersions of the second or a further layer, which increases precision.

FIG. 19 shows a simplified flow diagram according to further exemplary embodiments. In the optional block 170, a substrate 10 is provided, and in block 171, the substrate 10 is qualified, for example by carrying out at least one measurement, e.g., based on THz radiation TS (for example using reflections and/or transmissions or ellipsometry), for example at a number of measurement points MP equal to M. In further exemplary embodiments, in block 171 at least one dispersion is determined for the substrate 10, for example able to be characterised by a refractive index n_S and an extinction coefficient e_S or corresponding first and/or second vectors v1, v2 or the third vector v3.

In further exemplary embodiments, in block 172 a first layer 12-1 (see FIG. 17B) is applied to the surface 10a of the substrate 10, and the first layer 12-1 is then qualified. In further exemplary embodiments, the qualification of the first layer 12-1 comprises at least one of the following elements: a) carrying out at least one THz-based measurement (for example on the basis of reflections and/or transmissions, for example by means of ellipsometry), b) optionally carrying out measurements of at least one reference layer thickness (can also be carried out later in further exemplary embodiments, for example after the application of at least one further layer to the substrate 10), c) determining a plurality of dispersions of the first layer 12-1, wherein for example the reference layer thicknesses can operate freely in a range of a measurement uncertainty, or can for example be fixed on a layer thickness region that can be pre-determined or several reference thickness values that can be pre-determined, d) optionally, making a pre-selection of the determined dispersion in the first layer 12-1, for example automatically and/or via a user.

In further exemplary embodiments, in block 173 a second layer 12-2 (see FIG. 17C) is applied to the surface 10a of the substrate 10 or the first layer 12-1 already applied to the substrate 10, and the second layer 12-2 is then qualified, which can for example be carried out in further exemplary embodiments, for example analogously to the qualification of the first layer 12-1 according to block 172, for example with the difference that the dispersions of the first layer 12-1 determined or optionally pre-selected according to block 172 can additionally be used to qualify the second layer 12-2. In further exemplary embodiments, the qualification of the second layer 12-2 comprises at least one of the following elements: a) carrying out at least one THz-based measurement (for example on the basis of reflections and/or transmissions, for example by means of ellipsometry), b) optionally carrying out measurements of at least one reference layer thickness (can also be carried out later in further exemplary embodiments, for example after the application of at least one further layer to the substrate 10), c) determining a plurality of dispersions of the second layer 12-2, wherein for example the reference layer thicknesses can operate freely in a range of a measurement uncertainty, or can for example be fixed on a layer thickness region that can be pre-determined or several reference thickness values that can be pre-determined, d) optionally, making a pre-selection of the determined dispersion in the second layer 12-2, for example automatically and/or via a user.

In further exemplary embodiments, in block 174 a third layer 12-3 is applied to the surface 10a of the substrate 10 or the second layer 12-2 already applied to the substrate 10, and the third layer 12-3 is then qualified, which can for example be carried out in further exemplary embodiments, for example analogously to the qualification of the second layer 12-2 according to block 173, for example with the difference that the dispersions of the second layer 12-2 determined or optionally pre-selected according to block 173 can additionally be used to qualify the third layer 12-3.

The further optional block 175 symbolises the application and qualification of at least one further layer, for example analogously to the blocks 172, 173, 174 previously described in an exemplary manner with reference to FIG. 19.

The further block 176 according to FIG. 19 symbolises an optimisation and/or variation calculation, for example via all information or data obtained by means of the blocks 170 to 175, wherein for example a respective dispersion of the qualified layers can be determined, for example on the basis of a minimum of deviations from a pre-determined thickness for the respective layer and/or on the basis of a stability of the evaluation and/or on the basis of a fit, for example when fitting the dispersion using at least one dispersion function that can be pre-determined.

In the following, further exemplary embodiments are described with reference to FIGS. 20 to 33, which relate among other things to a configuration of possible THz-based measurements 110a, 110b for carrying out the method according to the exemplary embodiments.

FIG. 20 schematically shows an object having a substrate 10 having a layer 12-1 applied thereon. In FIG. 20, THz radiation TS can be beamed onto the first layer 12-1 of the object from above ("beaming from ahead"), for example via the THz device 210 according to FIG. 14, and THz radiation TSR reflected on the object can for example be detected via the THz device 210 (FIG. 14). As can also be seen from FIG. 20, the THz radiation TS beamed in is at least partially transmitted via the layer 12-1.

Figure 22:
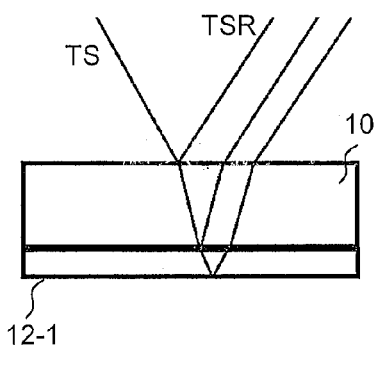
FIG. 22 shows a comparable configuration to FIG. 20, in which, unlike FIG. 20, the THz radiation TS is beamed onto the substrate (and then into the layer 12-1) ("beaming from behind").
Figure 23:
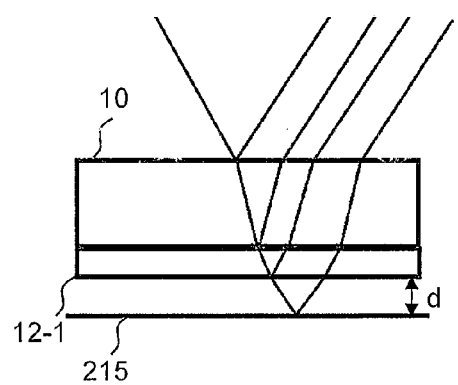

FIG. 23 shows a comparable configuration to FIG. 22, in which in addition to FIG. 22 a reflector 215 is arranged at a spacing d from the layer 12-1. In further exemplary embodiments, the spacing d can be freely pre-determined and can for example be at least periodically selected as <1 millimetre, for example at least periodically as <0.1 millimetre, for example at least periodically to be so small that a technical zero gap results between the reflector 215 and the layer 12-1.

Figure 16:
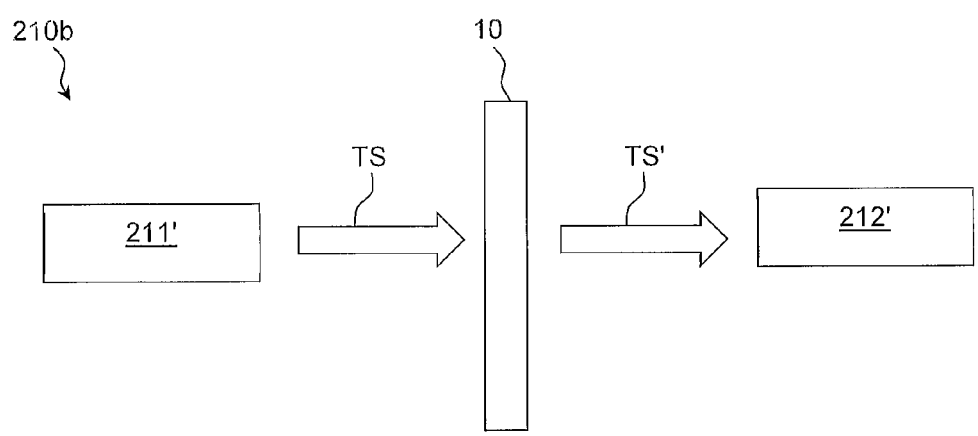
Figure 24:
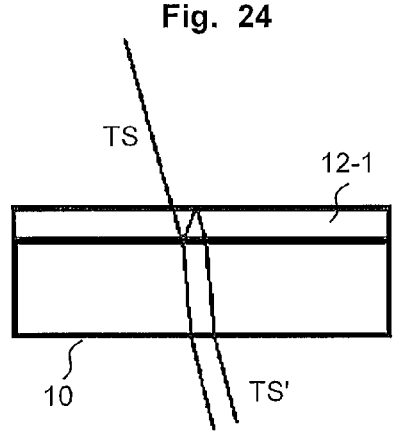

FIG. 24 shows a transmission of the terahertz radiation TS through the object, wherein the transmitted part TS' can for example be received by a detector 212' (FIG. 16).

Figure 25:
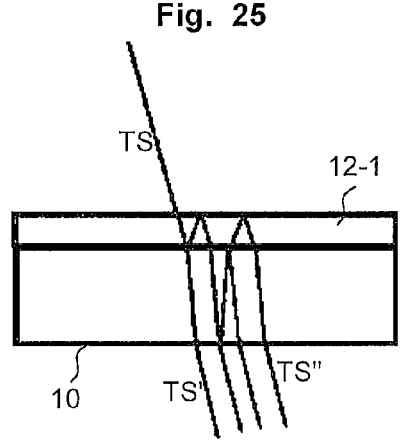

FIG. 25 shows a similar configuration of the object 10, 12-1 to FIG. 24 with transmission of the terahertz radiation TS including back reflection TS".

Figures 17A, 17B, 17C, 17D:
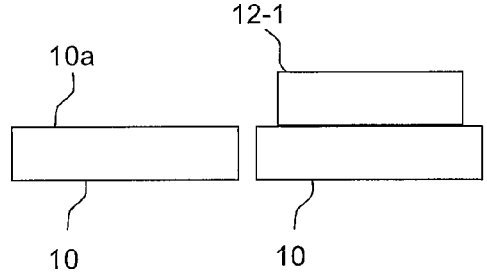
Figure 18:
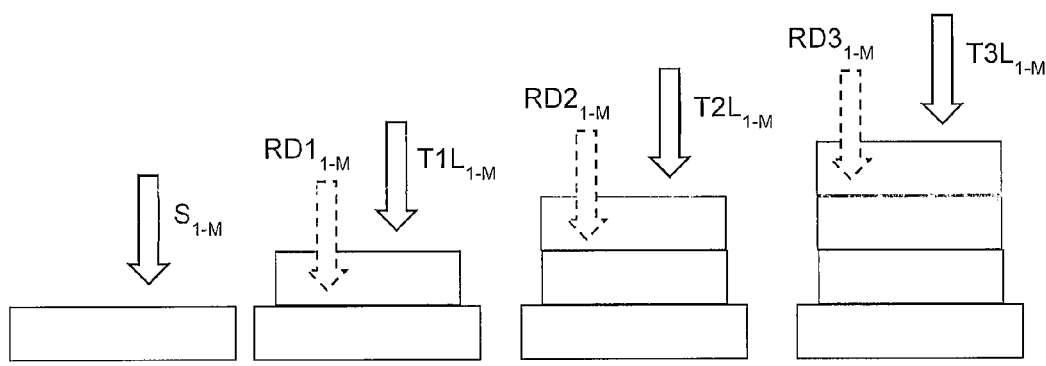
Figure 19:
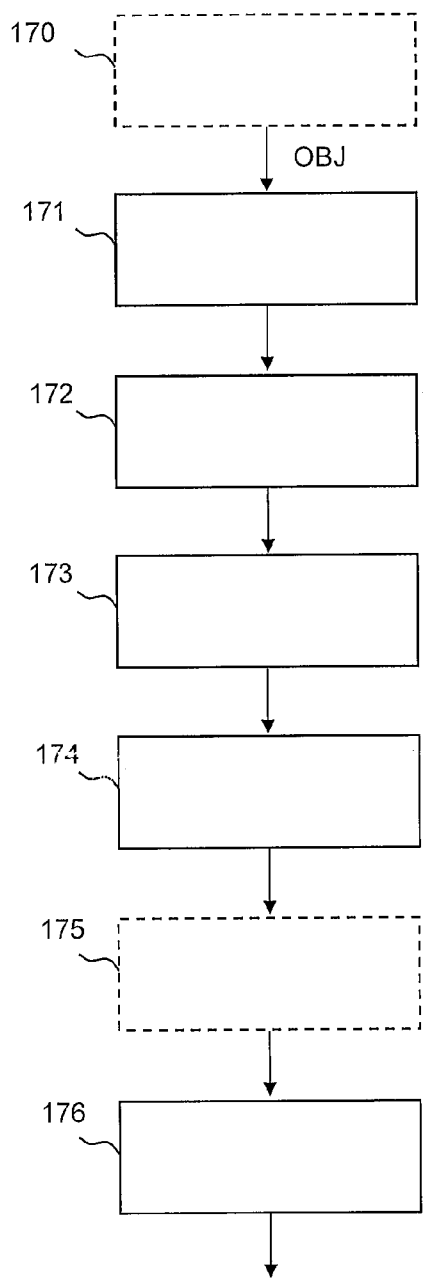
Figure 20:
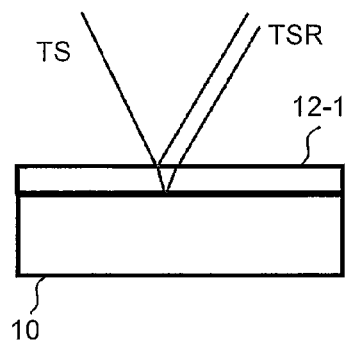
Figure 21:
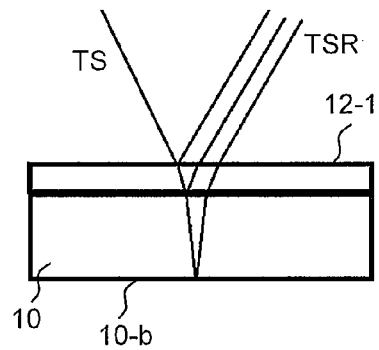
FIG. 21 shows a comparable configuration to FIG. 20, wherein in addition to FIG. 20 a so-called back reflection of the THz radiation TS hits a lower (in FIG. 21) boundary surface 10-b of the substrate 10.

It should be noted that presently in FIG. 20-25, a layer 12-1 is respectively imaged onto the substrate 10, but the respective measurement principle can however be used without also limiting the generality to objects having several layers, see for example FIG. 17D.

Figure 26:
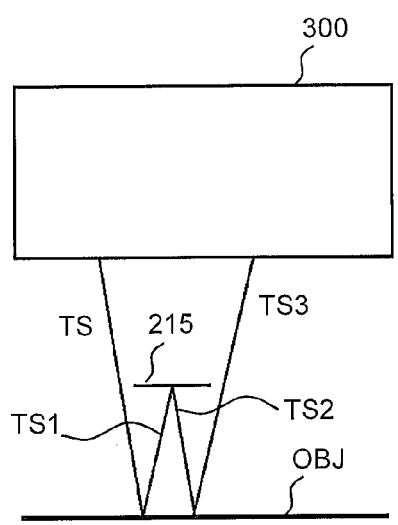

FIG. 26 shows, in an exemplary manner, a configuration for THz-based measurements according to further exemplary embodiments. A reflector 215 is assigned to a THz device 300, which is a THz measuring head, for example, which is presently arranged as an example between the object and the THz device 300 such that the THz radiation TS emitted by the THz device 300 at least partially directly hits the object OBJ (which can for example have a configuration according to FIG. 17A, 17B, 17C, 17D in further exemplary embodiments), wherein at least a part TS1 of the THz radiation TS directly hitting the object OBJ and reflected by the object OBJ falls onto the reflector 215, is reflected by the reflector 215 and is beamed onto the object OBJ again, see the reference numeral TS2, and is then reflected again by the object OBJ, and for example is detected by a detector (not shown) of the THz device 300, see the reference numeral TS3. In further exemplary embodiments, the exemplary configuration according to FIG. 26 can thus also be described as a reflection arrangement having multiple passage of the THz radiation TS through the object OBJ.

Figure 27:
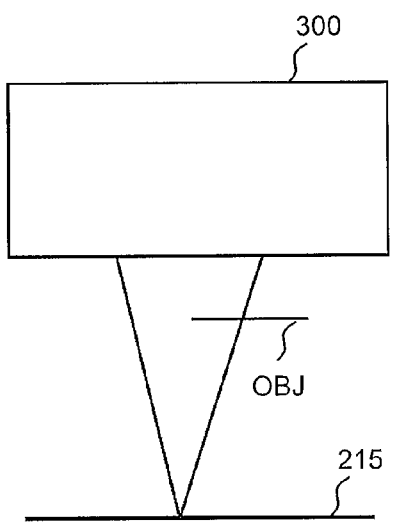
Figure 28:
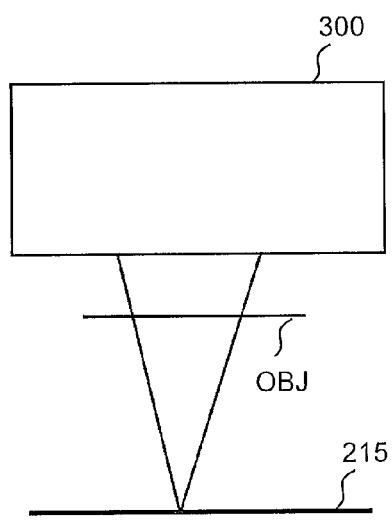

In the further exemplary configuration according to FIG. 27, there results for example in relation thereto a single passage of the THz radiation TS through the object OBJ, and in the further exemplary configuration according to FIG. 28, there results, for example, a multiple passage of the THz radiation TS through the object OBJ, wherein unlike the configuration according to FIG. 26, in the configuration according to FIG. 28, the object OBJ is arranged between the THz device 300 and the reflector 215.

Figure 29:
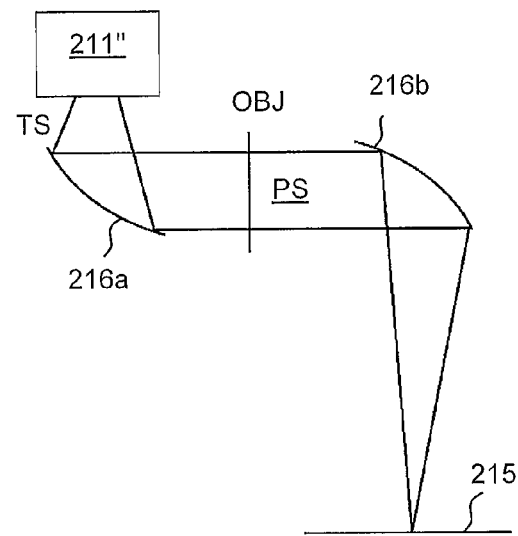

FIG. 29 shows, in an exemplary form, a configuration for THz-based measurements in relation to the object OBJ according to further exemplary embodiments, in which a transmission measurement can be carried out by means of a THz parallel beam PS. A THz device 211'', for example also designed as a transceiver, emits the THz radiation TS for this purpose to a first reflector, for example a mirror, for example a parabolic mirror 216a, which is designed such that the THz radiation TS beamed in is transformed into the THZ parallel beam PS with which the object OBJ is hit. After the transmission of the THz parallel beam PS through the object OBJ, the THZ parallel beam PS is diverted onto the for example flat reflector 215 by means of a further reflector, for example a mirror, for example a parabolic mirror 216b. The THz radiation reflected on the reflector 215 passes through the previously described beam path and then in the opposite direction, while being transmitted again in the form of a THz parallel beam PS through the object OBJ, and can be detected by the transceiver 211''. Alternatively, the THz radiation reflected on the reflector 215 can also be diverted to a separate THz detector (not shown), e.g., by a mirror system (not shown), wherein the unit 211'' can for example also be formed as a THz transmitter (and not transceiver).

Figure 30:
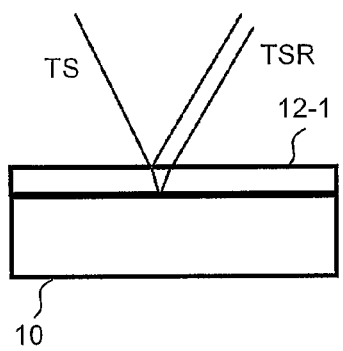
Figure 31:
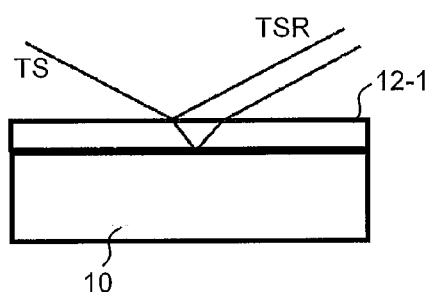

FIG. 30, 31 show as an example a measurement configuration according to further exemplary embodiments that differ in relation to an angle of incidence of the THz radiation TS onto the object. Comparable variations of the angle of incidence of the THz radiation TS onto the object can also be used for measurements with a transmission of the THz radiation through the object in further exemplary embodiments.

Figure 32:
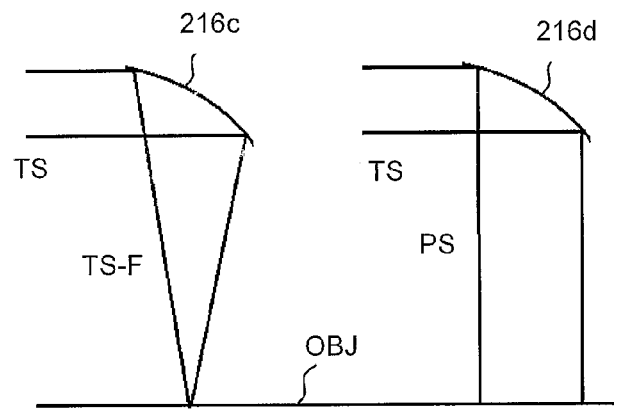

FIG. 32 shows further reflectors, for example parabolic mirrors 216c, 216d, which can be used in further exemplary embodiments to form a beam for example of the THz radiation TS. For example, the parabolic mirror 216c can be used in further exemplary embodiments to direct a focussed THz beam TS-F onto the object OBJ. For example, in further exemplary embodiments, the parabolic mirror 216d can be used to direct a THz parallel beam PS onto the object OBJ.

Figure 33:
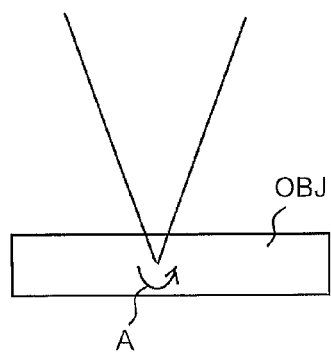

In further exemplary embodiments, FIG. 33, the object OBJ can be at least periodically rotated, for example relative to the THz device 210, wherein for example several THz-based measurements can be carried out with respectively different angles of rotation A, which can deliver further information about the material in question in the case of objects having anisotropies.

Figure 3A:
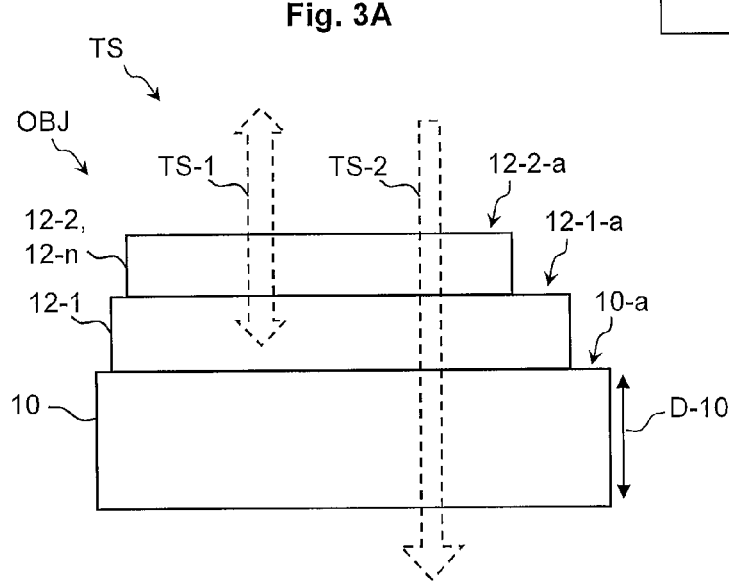
Figure 3B:
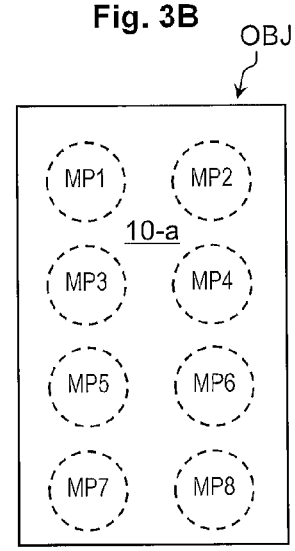
Figure 4:
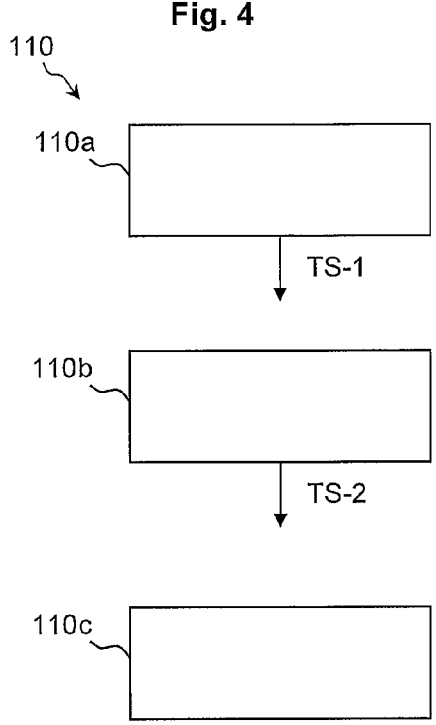
Figure 5:
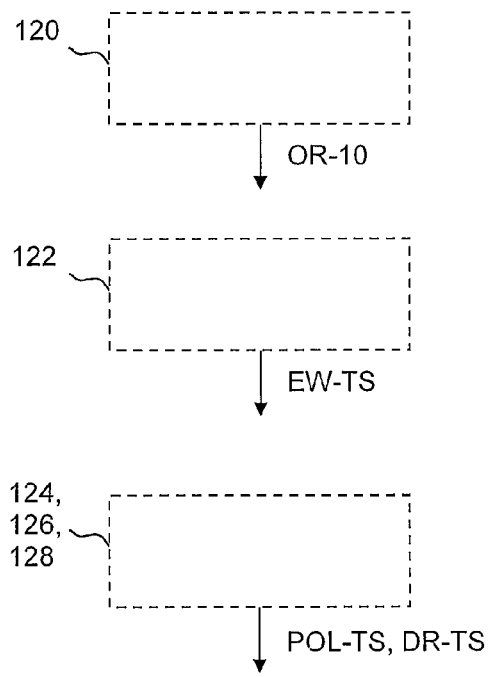
Figure 6:
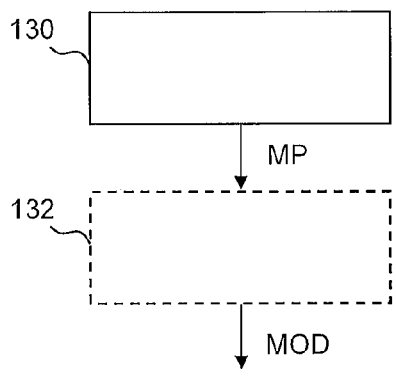
Figure 7:
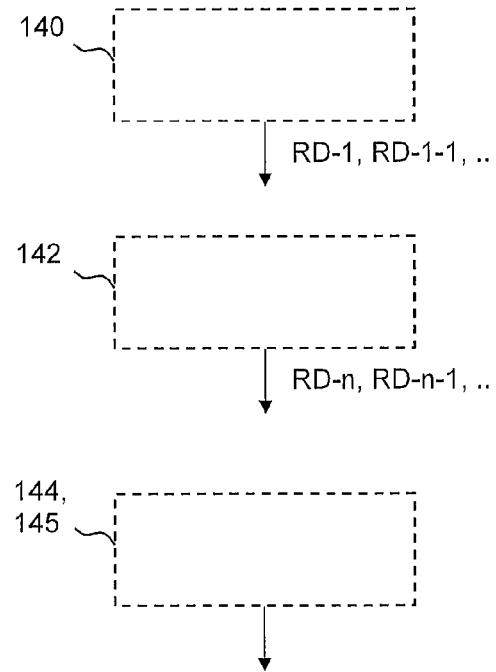
Figure 8:
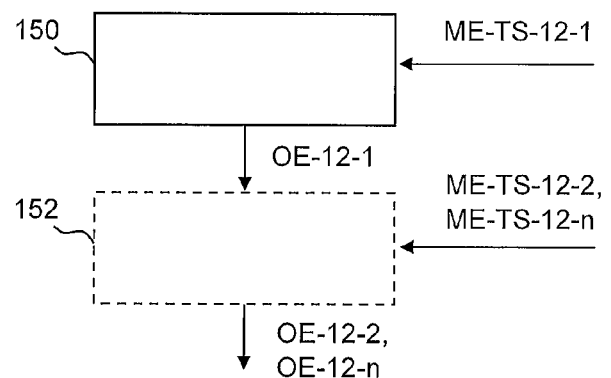
Figure 9:
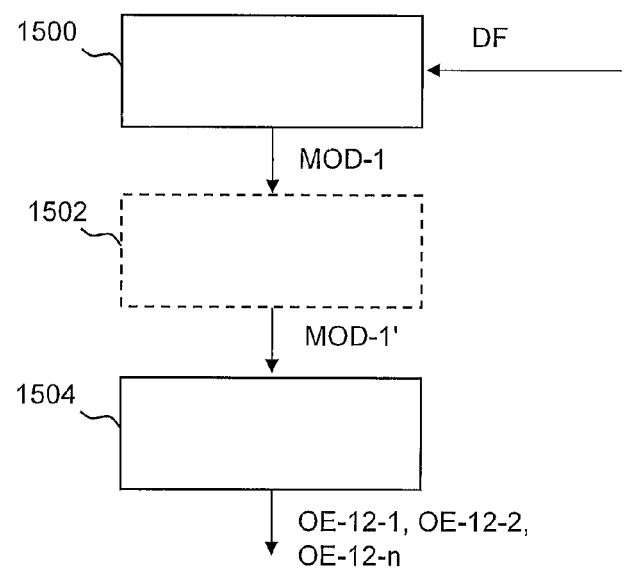
Figure 10:
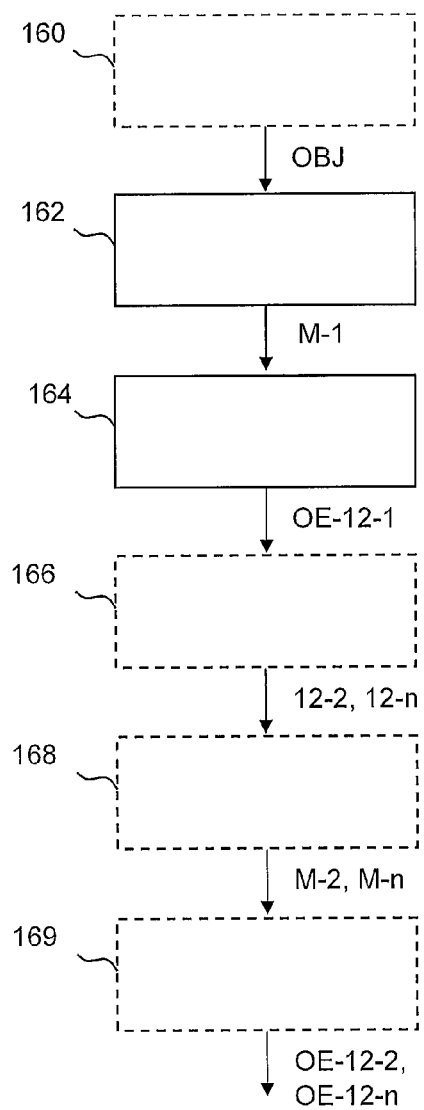
Figure 11:
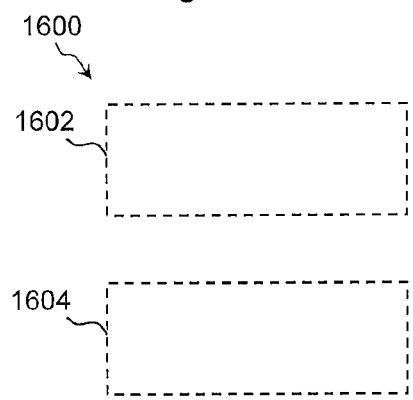
Figure 12:
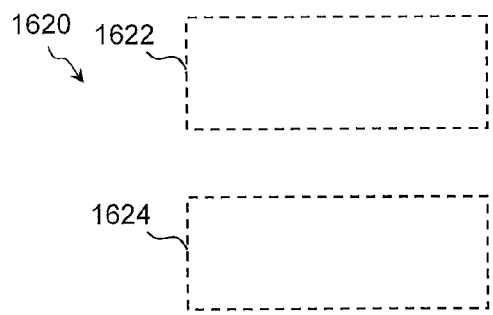
Figure 13A:
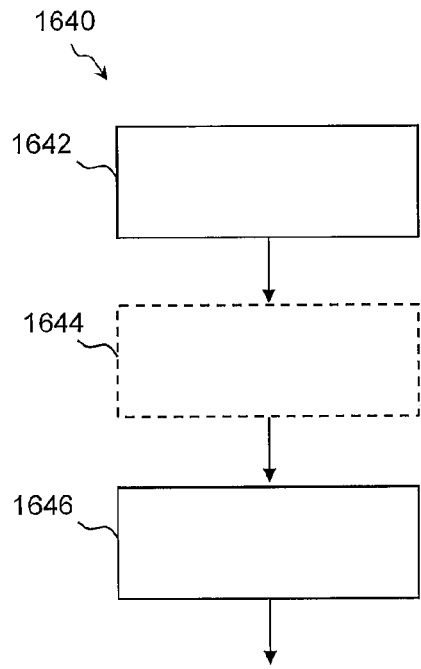
Figure 13B:
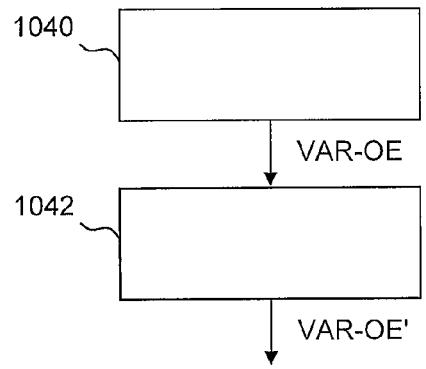
Figure 14:
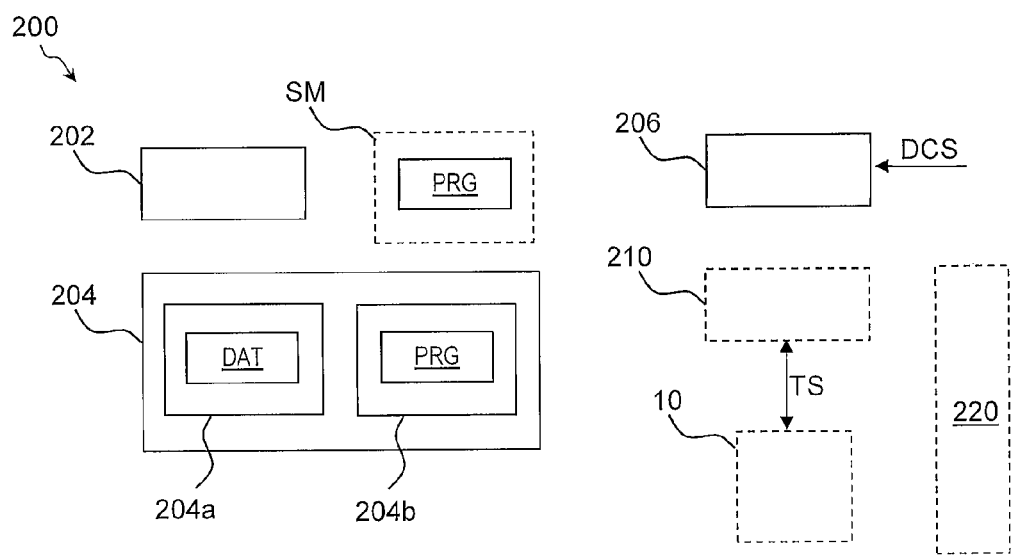
Figure 15:
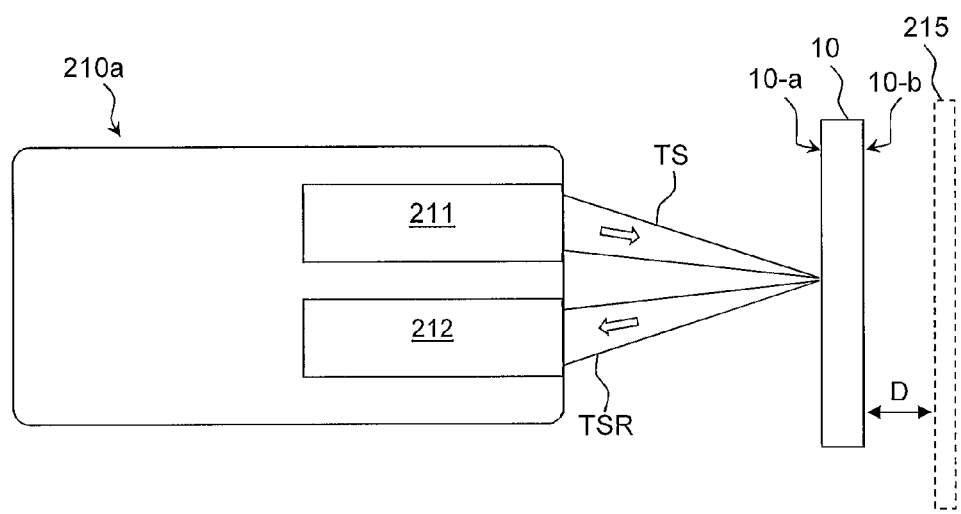

The configurations previously described as an example with reference to FIGS. 20 to 33 can be at least periodically used for measurements in relation to the substrate 10 or in relation to at least one layer 12-1, 12-2, 12n (FIG. 3A) applied to the substrate 10 in further exemplary embodiments, wherein, in further exemplary embodiments, the measurement results thus obtained are used to determine for example the at least one optical property, e.g., dispersion, of at least one of the layers.

Figure 34:
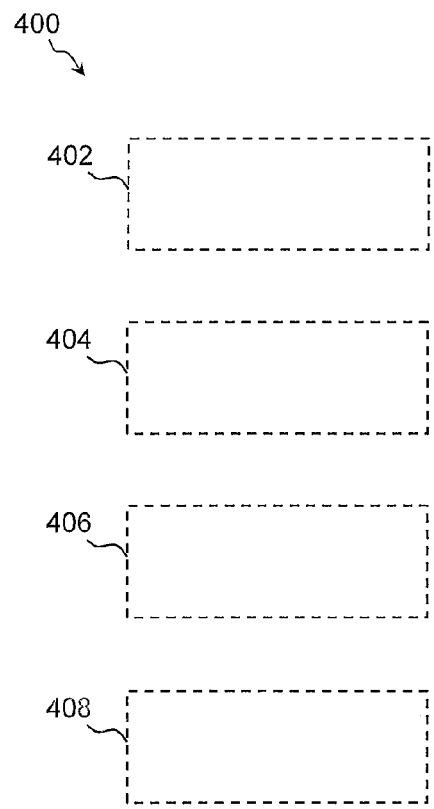

Further exemplary embodiments, FIG. 34, relate to a use 400 of the method according to the embodiments and/or of the device according to the embodiments and/or of the computer-readable storage medium according to the embodiments and/or of the computer program according to the embodiments and/or of the data carrier signal according to the embodiments for at least one of the following elements: a) determining 402 the at least one property E-12-1 of the first layer 12-1, b) determining 404 the at least one property E-12-$n$ of the at least one further layer 12-$n$, c) calibrating 406 a model and/or a device 200 for THz measurements, for example for THz measurements of measured objects OBJ having several layers 12-1, 12-2, 12-$n$ applied to a substrate 10, for example to determine layer thicknesses of the several layers applied to the substrate, d) broadening 408 or altering calibration data for THz measurements.

In the following, further aspects and advantages in relation to the principle according to the embodiments are described, which according to further exemplary embodiments can be combined with at least one of the previously described embodiments, respectively individually per se or in any combination with one another.

Figure 1:
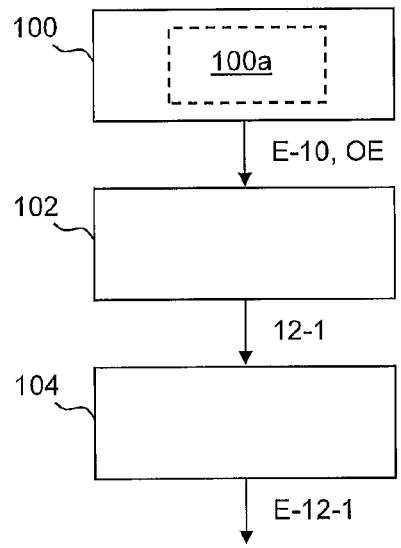
Figure 2:
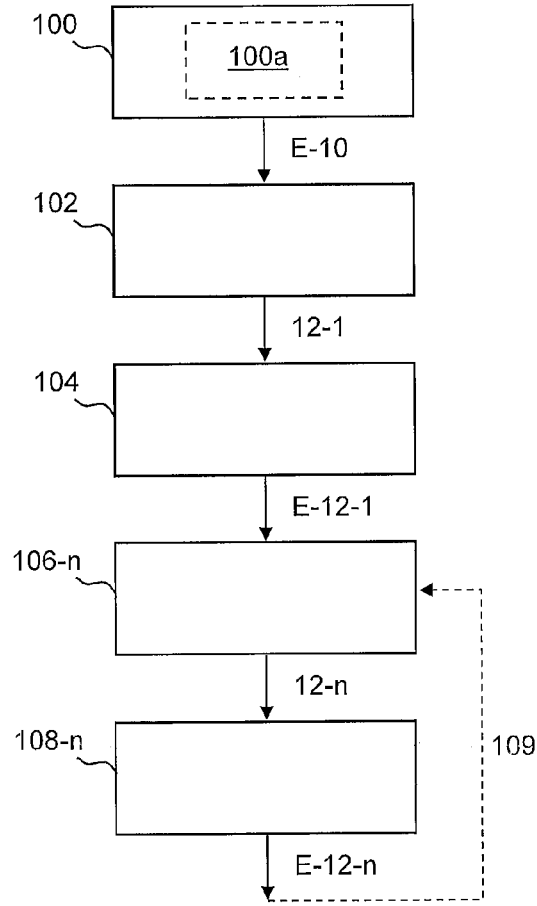

In further exemplary embodiments, the method according to the embodiments can be used to calibrate dispersions of a layer stack OBJ (FIG. 3A), wherein for example a sequential painting, and thus an application one after the other (see for example the blocks 102 (FIG. 1, 2), 106-$n$ (FIG. 2)) of the individual layers 12-1, 12-2, 12-$n$ is carried out. In further exemplary embodiments, one or several measurements, e.g., THz-based measurements and/or non-THz-based measurements are respectively carried out after the application of a layer in question, see for example the blocks 104, 108-$n$ according to FIG. 1, 2.

In further exemplary embodiments, the principle according to the embodiments can for example be used to calibrate a THz device 210, e.g., for THz time domain spectroscopy (TDS), for example to determine the layer thickness of a layer stack OBJ. The THz time domain spectroscopy is based, for example, on a reflection measurement in the THz spectral range, for example in the region between 0.1 THz and 30 THz previously specified as an example, for example between 0.3 THz and 10 THz. In further exemplary embodiments, the reflection spectrum of the layer stack OBJ (FIG. 3A) to be measured is for example compared with a reference measurement of a metal substrate 10. From the latter, a spectral reflectivity and phase difference can for example be calculated in further exemplary embodiments. In further exemplary embodiments, the reflectivity and resulting phase difference of a layer stack OBJ result for example from the layer thicknesses and the optical properties (e.g., refractive index n and extinction, e.g. able to be characterised by the extinction index e) of the individual layers 12-1, 12-2, 12-$n$, . . . and of the substrate 10, for example on the basis of Fresnel's formulae and e.g., on the basis of an offset between a sample measurement and a reference measurement. In further exemplary embodiments, the refractive index and the extinction can be dependent on frequency.

Further exemplary embodiments relate to a measurement of the reflectivity and the phase difference of a layer stack OBJ, and a comparison of this data with an optical model of the layer stack OBJ, which in particular contains the layer thicknesses of the layers 12-1, 12-2, 12-$n$ and their optical properties, e.g. dispersions, and which for example describes the spread of the terahertz radiation TS in the object OBJ. In further exemplary embodiments, the theoretical reflectivity spectrum can be adjusted to the measured spectrum by varying the optical model.

In particular in the case of objects OBJ having several layers 12-1, 12-2, 12-n, in further exemplary embodiments, not all layer thicknesses and the dispersions of the layers of the layer stack can be simultaneously unambiguously determined from a (e.g., THz-based) measurement. As the dispersions of the layer materials are for example not known in the THz spectral range in further exemplary embodiments, and for example are also unavailable in the literature, the principle according to the embodiments can advantageously be used to efficiently determine the optical properties of the layer materials of the several layers 12-1, 12-2, 12-n.

In further exemplary embodiments, it can be the case that several layer materials in the multi-layer system formed by the object OBJ interact with other layer materials for example of neighbouring layers (e.g., by means of diffusion, different interconnection, etc.), and their optical properties thus change (e.g., in comparison with the optical properties of these materials in an individual layer). In further exemplary embodiments, the principle according to the embodiments can thus be advantageously used to calibrate the dispersions of the layer materials in the actual layer system, for example able to be characterised by the object OBJ.

For example, the process according to the exemplary embodiments previously described with reference to FIG. 1 to FIG. 34 can be used to determine or calibrate, for example, the optical properties of the layer materials of the layers 12-1, 12-2, 12-n of a multi-layer system OBJ in the THz spectral range.

Further exemplary embodiments provide, for example, that after the coating step 102 (FIG. 1) 106-n (FIG. 2), for example after every coating step 102, 106-n, one or more measurements are carried out with different methods (e.g., THz-based and/or non-THz-based). In further exemplary embodiments, this advantageously enables one or several, for example all following layers, which are subsequently applied to be calibrated with corresponding prior knowledge of the layers underneath. In further exemplary embodiments, this enables both interactions between the layers to be accounted for and calibration of a layer with as complete as possible a prior knowledge of the stack or layer stack underneath.

As already described several times previously, exemplary embodiments enable a sequential coating, for example painting of all layers 12-1, 12-2, 12-n (FIG. 3A) of a multilayer and a characterisation or qualification (e.g., determining the dispersion(s) and/or the layer thickness(es)) of the respectively newly applied layer/of the stack OBJ, for example after each process step (e.g., painting), for example using the already-obtained information from the previous process steps.

In further exemplary embodiments, the substrate 10 can for example be a metallic body, for example a body part or a pattern of a body part of a vehicle. In further exemplary embodiments, the first layer 12-1 can be a primer, which functions for example as a bonding agent between the surface 10a of the substrate 10 and the second layer 12-2. In further exemplary embodiments, the second layer 12-2 can for example be a base coat. In further exemplary embodiments, the third layer 12-3 can for example be a clear coat.

The principle according to the embodiments is not limited to the exemplary use previously specified as an example of a painted body part and/or to the number of three layers given as an example, but can for example in particular also be applied to other multilayer systems accessible for THz measurement methods.

In further exemplary embodiments, several dispersions or dispersion values per layer and measurement point or, alternatively or in addition, a shared dispersion per layer for all measurement points (e.g., simultaneous fitting of all measurement points) can for example be determined depending on the number of layers and the number M of measurement points MP.

In further exemplary embodiments, an optimal dispersion combination of all the dispersions can be determined via a variation calculation, wherein for example a discrimination is made e.g. via the best fit or a best agreement with reference layer thicknesses or a highest sensitivity or a highest stability. Further criteria for a discrimination of the respective best dispersion for the layers in question can also be used for the specified variation calculation in further exemplary embodiments.

In further exemplary embodiments, it can be the case that the "best" dispersion of an individual layer is not always the "best" dispersion for the layer stack OBJ (e.g., due to diffusion, etc), optionally a certain combination of dispersions of the layers fits best for the layer stack OBJ, in which the dispersions of the respective individual layers respectively fit comparatively poorly. With the principle according to the embodiments, the dispersions that are the best overall fit, for example also accounting for the possible interactions between neighbouring layers, can be determined.

In further exemplary embodiments, the method according to the embodiments can be used in a robot system, e.g., having a robot for positioning a THz device 210, and/or in another system, e.g., laboratory system.

In further exemplary embodiments, the method according to the embodiments can be used in a target system (e.g., system for e.g., automated product measurements e.g., in a production device), which is operated, for example, on the basis of the information determined according to the embodiments, e.g., the determined dispersion(s) of the layer(s) 12-1, 12-2, 12-n, and/or in another measurement system (e.g., designed to carry out THz-based measurements according to the principle of reflectometry and/or transmission and/or ellipsometry, etc.).

In further exemplary embodiments, the target system is for example a THz measurement system, e.g., for a serial production, which can be calibrated on the basis of or with the data (e.g. optical properties of the at least one layer) obtained according to exemplary embodiments) and measures, for example, layer thicknesses e.g. on painted body parts.

The principle according to the embodiments is not limited to the previous exemplary spectral range of the THz radiation TS, but can also be used in spectral ranges of the THz radiation deviating from said exemplary spectral range.

In further exemplary embodiments, an additional characterisation of the layer thicknesses of the layers 12-1, 12-2, 12-n can optionally be made, e.g., to determine the reference layer thicknesses $RD1_{1-M}$, $RD2_{1-M}$ ... with other methods, e.g., tactile methods and/or optical measurements (e.g., confocal microscopy, white light interferometer, OCT, . . . ), micrographs.

In further exemplary embodiments, the method according to the embodiments can be used to determine optical constants/dispersions of individual layers in a multilayer system.

In further exemplary embodiments, the method according to the embodiments is in particular not limited to the THz spectral range, but is equally conceivable for ellipsometry and/or reflection and transmission measurements in all current spectral ranges (e.g. in the visible or near-infrared spectral range).

Figure 35:
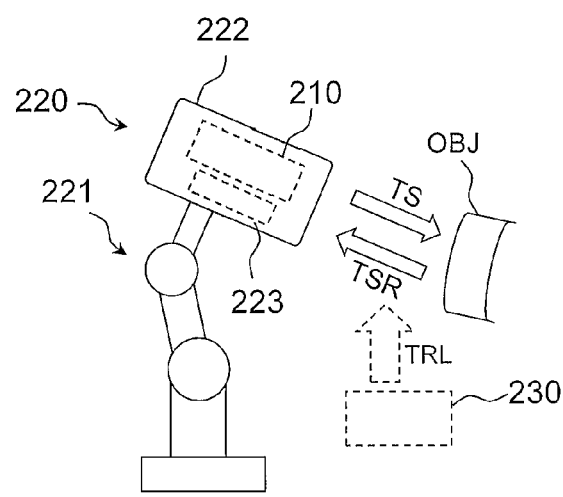

In further exemplary embodiments, FIG. 35, the device 200 has a positioning device 220 that is designed to move the THz device 210 and/or the object OBJ or substrate 10 relative to one another (e.g., rotationally and/or translationally). If an optional reflector 215 (FIG. 15) is provided, the positioning device 220 can also be designed to move the optional reflector 215 relative to the THz device 210 and/or to the object or substrate 10.

In further exemplary embodiments, the positioning device 220 has a robot 221, on which for example a THz device 210 designed as a THz measuring head is arranged to carry out THz-based measurements.

In further exemplary embodiments, the positioning device 220 has at least one further placement element 222 in addition or as an alternative to the robot 221, the placement precision of said placement element for example being greater than that of the robot 221, which increases the precision of the measurements e.g., to determine material data and/or for calibration, e.g., because the different measurement points MP can thus be respectively brought precisely into the focus of the THz radiation TS.

In further exemplary embodiments, the positioning device 220 has a 2D goniometer, for example as a further placement element 222, and e.g., an actuator for a z-axis, and optionally a spacing and/or angle measurement unit 223, for example to determine the relative position between sample OBJ and measuring head 210.

In further exemplary embodiments, the process laid out in an exemplary manner in the following is carried out for a number of measurement points MP1, MP2, . . . , MP8 (FIG. 3B) equal to M on a sample OBJ:
1. rough positioning in space x1, y1, z1 with a THz measuring head 210 on a robot 221, e.g., approaching the first measurement point MP1, and thus aligning the THz measurement head 210 such that the focus of the THz radiation TS is on the first measurement point MP1,
2. spacing/angle measurement,
3. optionally position correction, e.g., by means of the at least one further placement element 222,
4. control measurement of a spacing/angle,
5. if a spacing/angle are within desired tolerance, proceed to step 6, otherwise return to step 3,
6. THz measurement(s),
7. potentially another comparison measurement, e.g., reference layer thickness by means of an optical and/or tactile method,
8. approaching the next measurement point MP2, and thus e.g., aligning the THz measuring head 210 such that the focus of the THz radiation TS lies on the second measurement point MP2, etc., optionally repeating the process, e.g. until all the number of measurement points equal to M has been adjusted.

In further exemplary embodiments, a unit 230 is provided for pressurising at least a part of the beam path of the THz radiation TS, TSR with protective gas TRL, e.g., dry air, which can further increase precision, as an unintended absorption of the THz radiation TS is reduced, for example, by moist environmental air.

In further exemplary embodiments, the device 200 can for example be used in a production device or paint shop, for example to calibrate a THz measurement system based on the determined optical properties, e.g., dispersions, of the layers 12-1, 12-2, 12-n of the object OBJ.

In further exemplary embodiments, in a sequential calibration of the layers 12-1, 12-2, 12-n, a particular layer thickness region (or a limited number of measurement points) is covered, wherein actually occurring thickness deviations on coated substrates in a target system (for example a THz measurement system for serial production that can be calibrated with the data received according to the embodiments and measures layer thicknesses, e.g., of painted body parts) can be significantly larger. In particular in the case of metallic paints, material data is dependent on thickness, said material data can for example be precisely measured in further embodiments within or around the thickness region of the already present/calibrated material data. In further exemplary embodiments, it is thus suggested that calibration data that has for example been determined by means of the method according to the embodiments is for example continuously expanded and/or modified, e.g., in an ongoing production process or other processing by the target system.

In further exemplary embodiments, e.g., in instances of coated objects e.g., painted parts having significantly different thicknesses, the following process can be carried out: a) THz-based measurements of the layer stack (e.g., already present), b) comparative measurements for thickness, c) post-calibration (and thus increase of the calibration) of the corresponding layers (usually base coat 12-1) in the entire system OBJ, wherein, for example, a successive increase of a measurable thickness region is enabled.

The invention claimed is:
1. Method for determining at least one property of at least one first layer that is applied to a substrate using at least one measurement method based on reflection of THz radiation and/or at least one measurement method based on transmission of the THz radiation, comprising:
   determining at least one property of the substrate, which has at least one of the following elements: a) optical properties, b) thickness, c) magnetic permeability, d) electrical conductivity, e) roughness,
   applying the first layer to the substrate, determining the at least one property of the first layer, which has at least one of the following elements: a) optical properties, b) thickness, c) magnetic permeability, d) electrical conductivity, e) roughness,
   determining at least one optical property of the first layer on the basis of a) at least one measurement result of at least one measurement method based on THz radiation in relation to the first layer applied to the substrate,
   applying at least one further layer, and, determining at least one property of the at least one further layer, which has at least one of the following elements: a) optical properties, b) thickness, c) magnetic permeability, d) electrical conductivity, e) roughness,
   determining at least one optical property of the at least one further layer on the basis of a) at least one measurement result of at least one measurement method based on THz radiation in relation to the at least one further layer, and
   wherein the determining of the at least one optical property of the at least one further layer is additionally carried out on the basis of at least one reference layer thickness and/or at least one optical property of at least one layer applied to the substrate before the at least one further layer and/or on the basis of at least one property of the substrate.

2. Method according to claim 1, wherein determining properties of the substrate further comprises: determining at least one surface property of a surface of the substrate, wherein the at least one surface property has at least one of the following elements: a) roughness, b) shape, c) spatial position, d) structures.

3. Method according to claim 2, wherein the at least one surface property is determined by means of at least one of the following elements: a) confocal microscopy, b) interferometry, c) optical coherence tomography, d) three-dimensional imaging.

4. Method according to claim 1, further comprising: using THz spectroscopy and/or THz ellipsometry, and/or at least one further measurement method, not based on THz radiation for at least one of the following elements: a) determining at least one property of the substrate, b) determining the at least one property of the first layer, c) determining the at least one property of the at least one further layer, d) determining the at least one surface property of a surface of the substrate.

5. Method according to claim 1, further comprising: varying an orientation of the substrate to an angle of incidence of the THz-radiation or of an object having the substrate to an angle of incidence of the THz-radiation.

6. Method according to claim 1, further comprising: varying an angle of incidence of the THz radiation with respect to the normal vector of a surface of the substrate or of a thereon provided layer.

7. Method according to claim 1, further comprising at least one of the following elements: a) varying a polarisation of the THz radiation, b) varying a direction of passage of the THz radiation, c) at least periodically reflecting the THz radiation.

8. Method according to claim 1, further comprising: carrying out at least one measurement method or the at least one measurement method for measurement point.

9. Method according to claim 8, further comprising: combining measurement results of a plurality of measurement points of the measurement method, wherein the measurement results of a plurality of measurement points of the at least one measurement method for the substrate and/or the at least one layer are used as input data for a model for determining the at least one property, and evaluating by combining measurement results for determining the at least one property are used as input data for a model for determining the at least one property, and evaluation by linking measurement results for determining a variant of a property of a layer which describes a plurality of measurement results with the aid of the model.

10. Method according to claim 9, further comprising: evaluating the measurement results by means of the model and/or based on a comparison with further reference measurements.

11. Method according to claim 8, further comprising: determining at least one reference layer thicknesses, of the first layer, at on at least one measurement point, and/or determining at least one reference layer thickness, of the at least one further nth layer, on at least one measurement point, wherein the determination of the at least one reference layer thickness is carried out on the basis of the measurement method, not based on THz radiation.

12. Method according to claim 11, further comprising: specifying and/or accounting for deviations for the at least one reference layer thickness.

13. Method according to claim 8, wherein a) the carrying out of the at least one measurement method for at least one measurement point, and/or b) the determination of the at least one reference layer thickness, of the first layer on at least one measurement point, and/or c) the determination of the at least one reference layer thickness of the at least one further layer is respectively carried out for the same at least one measurement point of the first layer.

14. Method according to claim 13, further comprising: specifying and/or accounting for deviations for the at least one reference layer thickness.

15. Method according to claim 1, wherein said step of determining at least one optical property of the first layer is additionally on the basis of b) at least one or the at least one reference layer thickness.

16. Method according to claim 15, wherein said step of determining at least one optical property of the at least one further layer is additionally on the basis of b) at least one or the at least one reference layer thickness of the at least one further layer.

17. Method according to claim 1, wherein determining the at least one optical property comprises: modelling an object having the substrate and at least the first layer by means of a first model, adjusting the first model to the determined reference layer thickness and/or the at least one measurement result of the at least one measurement method based on THz radiation in relation to the first layer applied to the substrate, wherein an adjusted first model is obtained, and determining the at least one optical property on the basis of the first model and/or the adjusted first model.

18. Method according to claim 1, comprising: carrying out at least one measurement in relation to an object having the substrate and the first layer by means of a measurement method based on reflection of the THz radiation and/or at least one measurement method based on transmission of the THz radiation and/or at least one further measurement method, not based on THz radiation, at a number of points of the object, determining at least one optical property of the first layer on the basis of the at least one measurement.

19. Method according to claim 18, further comprising at least one of the following elements: a) applying at least one further layer, to the first layer, b) carrying out at least one further measurement in relation to an object having the substrate and the first layer and the at least one further layer by means of a measurement method based on reflection of the THz radiation and/or at least one measurement method based on transmission of THz radiation and/or at least one further measurement method, not based on THz radiation, at a number of points of the object, c) determining at least one optical property of the at least one further layer on the basis of the at least one further measurement.

20. Method according to claim 8, comprising: determining several variants of the at least one property of the first layer and/or at least one further layer or the at least one further layer, for example on the basis of measurement results in relation to different measurement points and/or layer thickness regions and, determining a particular variant of the several variants.

21. Device for carrying out the method according to claim 1 having at least one THz device for emitting and/or receiving THz radiation.

22. Device according to claim 21, further having at least one reflector for the THz radiation, wherein the device is designed to arrange the reflector at least periodically a) at least partially in a beam path of the THz radiation and/or b) in a region of at least one surface of the substrate or of an object having the substrate having a spacing from the at least one surface that can be pre-determined.

23. Use of the method according to claim 1 and/or of the device for carrying out the method according to claim 1 having at least one THz device for emitting and/or receiving THz radiation, for at least one of the following elements: a) determining the at least one property of the first layer, b) determining the at least one property of the at least one further layer, c) calibrating a model and/or a device for THz measurements, for THz measurements of measured objects having several layers applied to a substrate, to determine layer thicknesses of the several layers applied to the substrate, d) broadening or altering calibration data for THz measurements, or calibrating or recalibrating on the basis of further THz measurements.

\* \* \* \* \*